US012786847B2

(12) United States Patent
Nayak et al.

(10) Patent No.: US 12,786,847 B2
(45) Date of Patent: Nov. 3, 2026

(54) NETWORK SLICE ADMISSION CONTROL BASED ON AVAILABILITY OF QUOTA AT NSACF APPARATUS IN WIRELESS NETWORK

(71) Applicant: Samsung Electronics Co., Ltd., Gyeonggi-do (KR)

(72) Inventors: Ashok Kumar Nayak, Bangalore (IN); Varini Gupta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 373 days.

(21) Appl. No.: 18/559,182

(22) PCT Filed: May 4, 2022

(86) PCT No.: PCT/KR2022/006419
§ 371 (c)(1),
(2) Date: Nov. 6, 2023

(87) PCT Pub. No.: WO2022/235081
PCT Pub. Date: Nov. 10, 2022

(65) Prior Publication Data
US 2024/0244507 A1 Jul. 18, 2024

(30) Foreign Application Priority Data

| | | | |
|---|---|---|---|
| May 5, 2021 | (IN) | ............................. | 202141020557 |
| Jul. 20, 2021 | (IN) | ............................. | 202141032700 |
| Apr. 26, 2022 | (IN) | ............................. | 202141020557 |

(51) Int. Cl.
*H04W 48/06* (2009.01)
*H04W 48/18* (2009.01)
*H04W 60/00* (2009.01)

(52) U.S. Cl.
CPC .......... *H04W 48/06* (2013.01); *H04W 48/18* (2013.01); *H04W 60/00* (2013.01)

(58) Field of Classification Search
CPC ...... H04W 48/06; H04W 48/18; H04W 60/00
(Continued)

(56) References Cited

U.S. PATENT DOCUMENTS 10,425,987 B2 * 9/2019 Yang ..................... H04W 76/12
12,250,557 B2 * 3/2025 Nooren ................. H04W 48/18
(Continued)

FOREIGN PATENT DOCUMENTS

EP 3800930 4/2021
WO WO 2018/192340 10/2018
(Continued)

OTHER PUBLICATIONS

PCT/ISA/210 Search Report dated Aug. 9, 2022 issued on PCT/KR2022/006419, pp. 4.
(Continued)

*Primary Examiner* — Qutbuddin Ghulamali
(74) *Attorney, Agent, or Firm* — The Farrell Law Firm, P.C.

(57) ABSTRACT

The disclosure relates to a 5G or 6G communication system for supporting a higher data transmission rate. Embodiments herein provide a method for NSAC based on availability of a quota at a NSACF apparatus in a wireless network. The method includes registering, by an AMF apparatus or a SMF apparatus, a plurality of UEs to at least one network slice requiring admission control; detecting, by AMF apparatus or SMF apparatus, enablement of a configuration to perform the admission control on an already deployed existing slice based on availability of the quota at NSACF apparatus in the wireless network; sending, by AMF apparatus, a number of UEs per slice update request message to NSACF apparatus to increase a count of the quota for the already registered UEs.

19 Claims, 15 Drawing Sheets

(58) Field of Classification Search
USPC ........................................................ 455/435.1
See application file for complete search history.

(56) References Cited

U.S. PATENT DOCUMENTS

| | | | | |
|---|---|---|---|---|
| 2019/0394655 | A1* | 12/2019 | Rahman | H04L 41/142 |
| 2022/0330139 | A1* | 10/2022 | Lee | H04W 48/16 |
| 2023/0015471 | A1* | 1/2023 | Hashmi | H04W 48/08 |
| 2024/0147235 | A1* | 5/2024 | Velev | H04L 63/10 |
| 2024/0373300 | A1* | 11/2024 | Kim | H04W 36/0061 |
| 2024/0397418 | A1* | 11/2024 | Velev | H04W 48/02 |

FOREIGN PATENT DOCUMENTS

| | | |
|---|---|---|
| WO | WO 2020/064697 | 4/2020 |
| WO | WO 2021/054732 | 3/2021 |

OTHER PUBLICATIONS

PCT/ISA/237 Written Opinion dated Aug. 9, 2022 issued on PCT/KR2022/006419, pp. 7.
Examination Report dated Nov. 28, 2022 issued on Indian Application No. 202141020557, pp. 5.
3GPP TS 23.502 V17.0.0 (Mar. 2021), pp. 637.
3GPP TS 23.501 V17.0.0 (Mar. 2021), pp. 482.
Matrixx, "TR 32.847—Solution for Key Issue #1 based on new charging service", 3GPP TSG SA WG5 Meeting 135-e.
TDoc S5-211076 electronic meeting, online, Jan. 25-Feb. 3, 2021, pp. 4.

* cited by examiner

[Fig. 1]
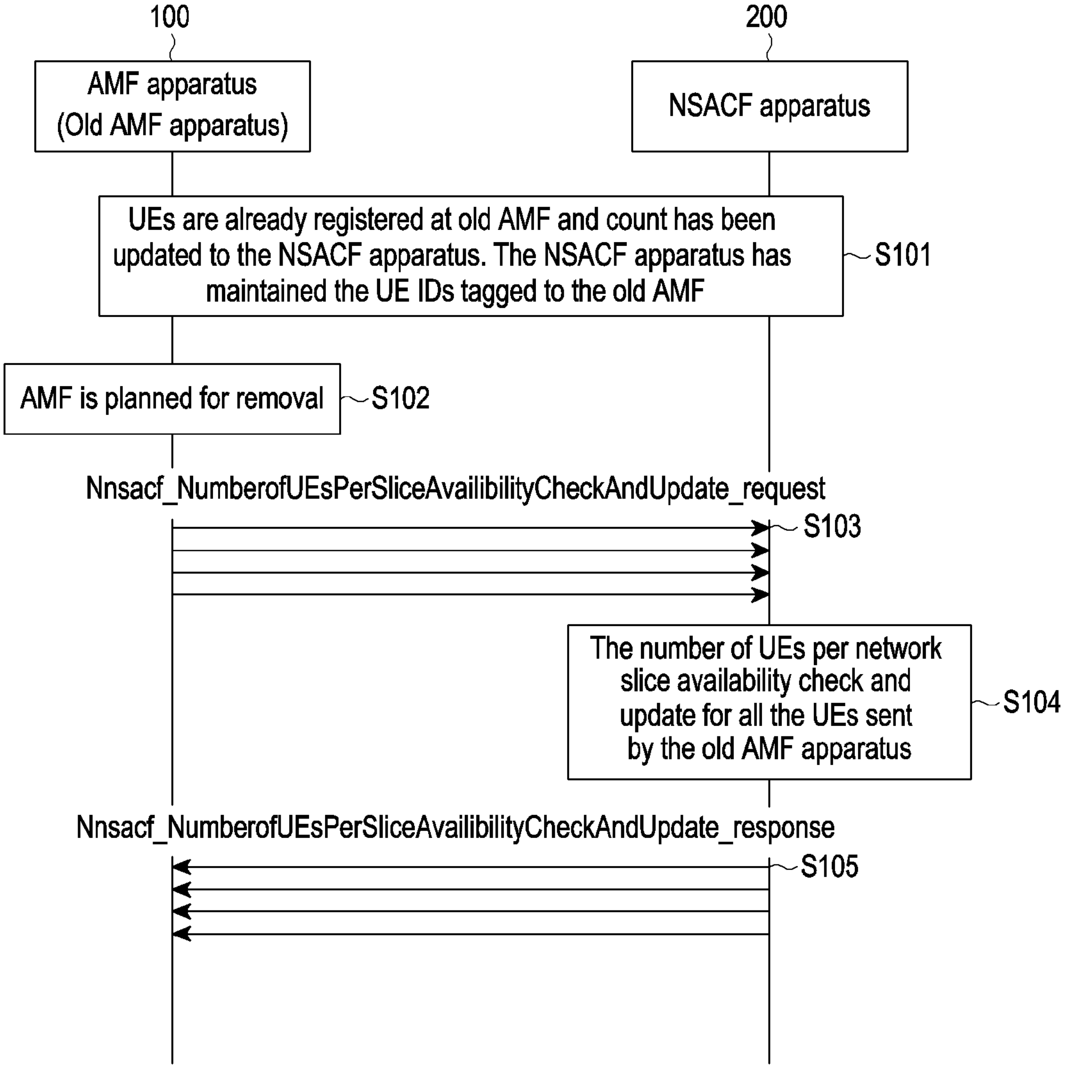

[Fig. 2]
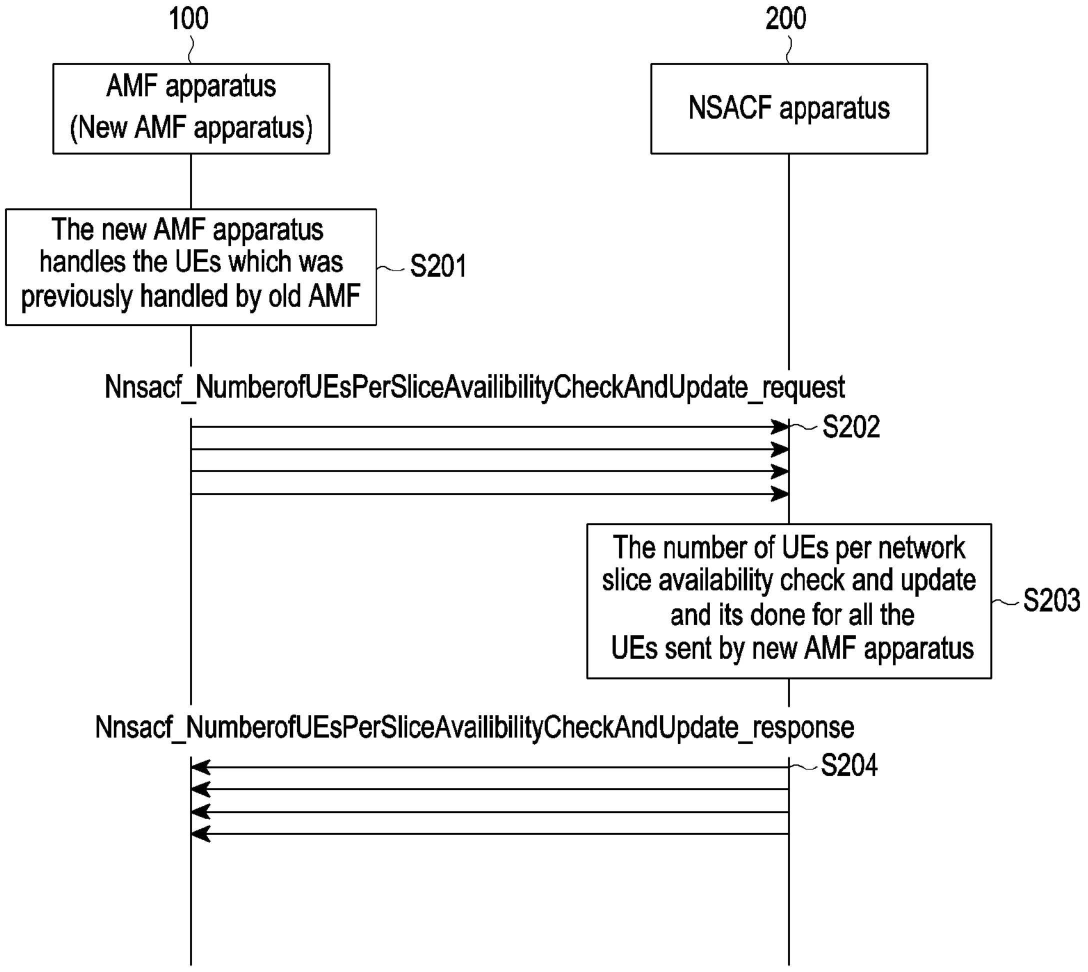

[Fig. 3]
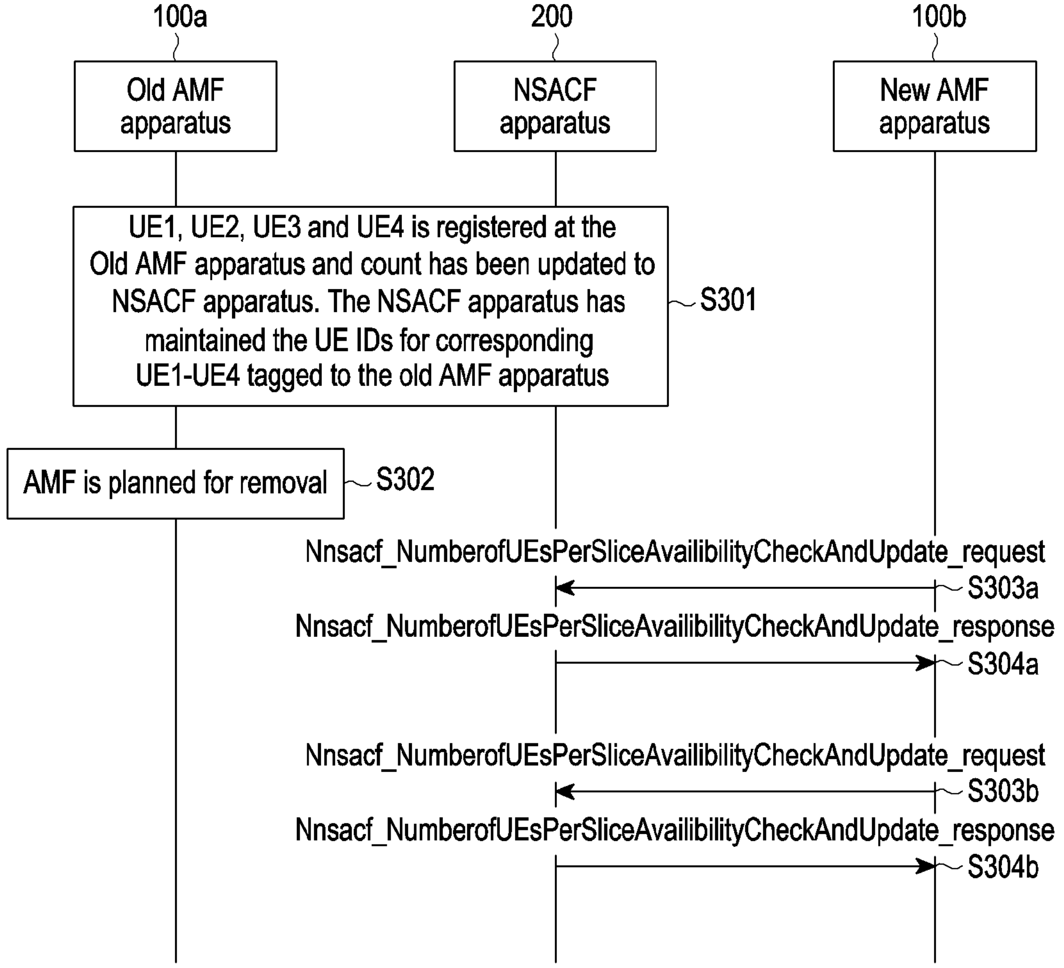

[Fig. 4]
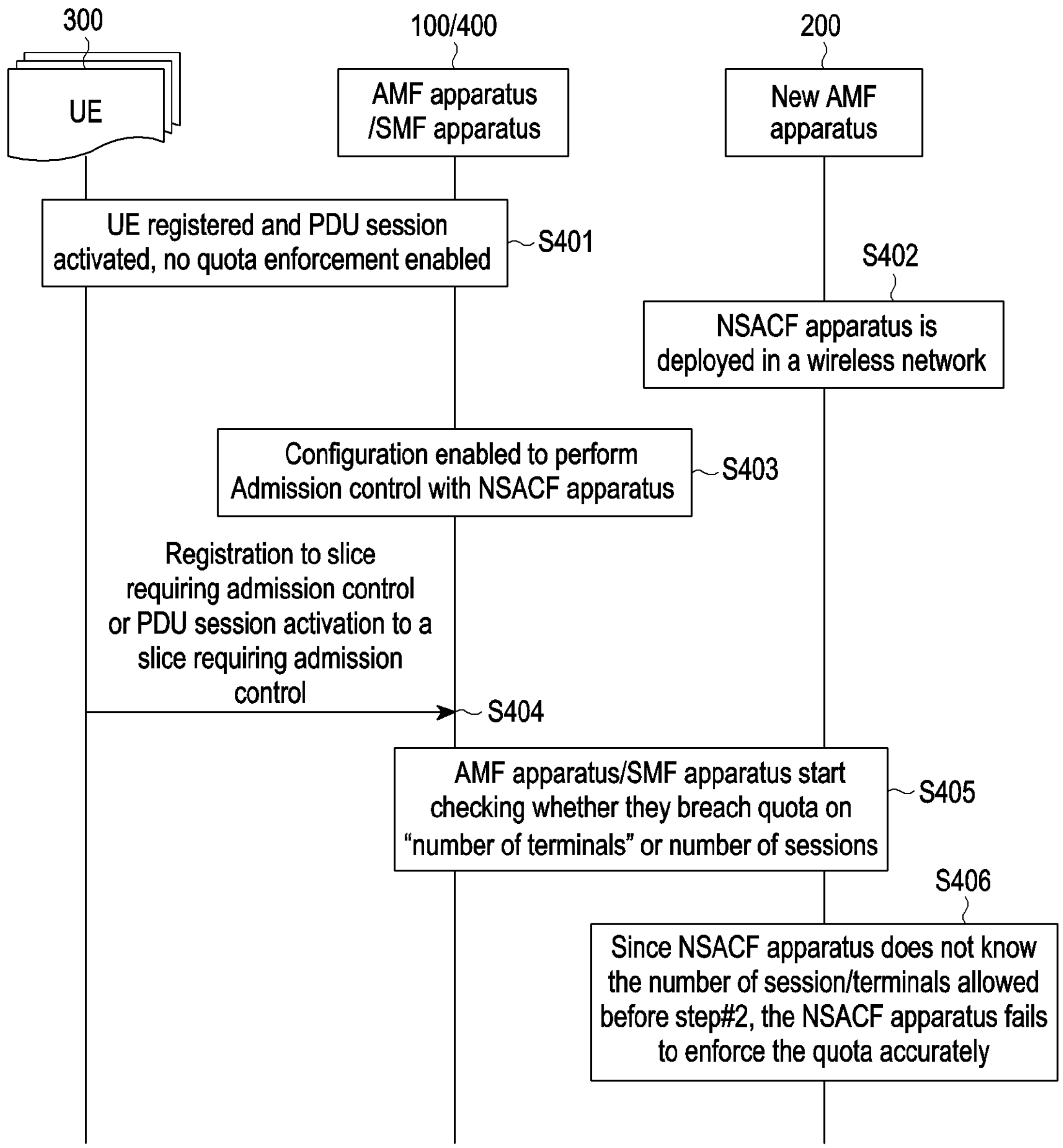

[Fig. 5]
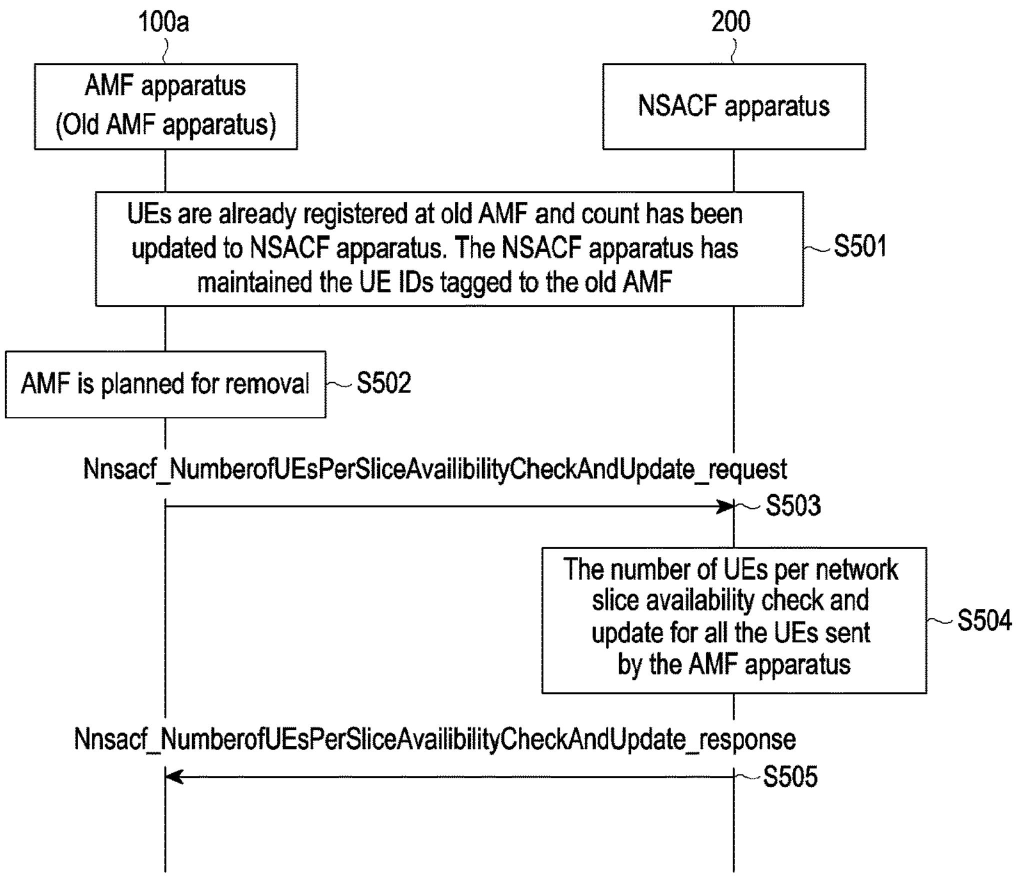
[Fig. 6]
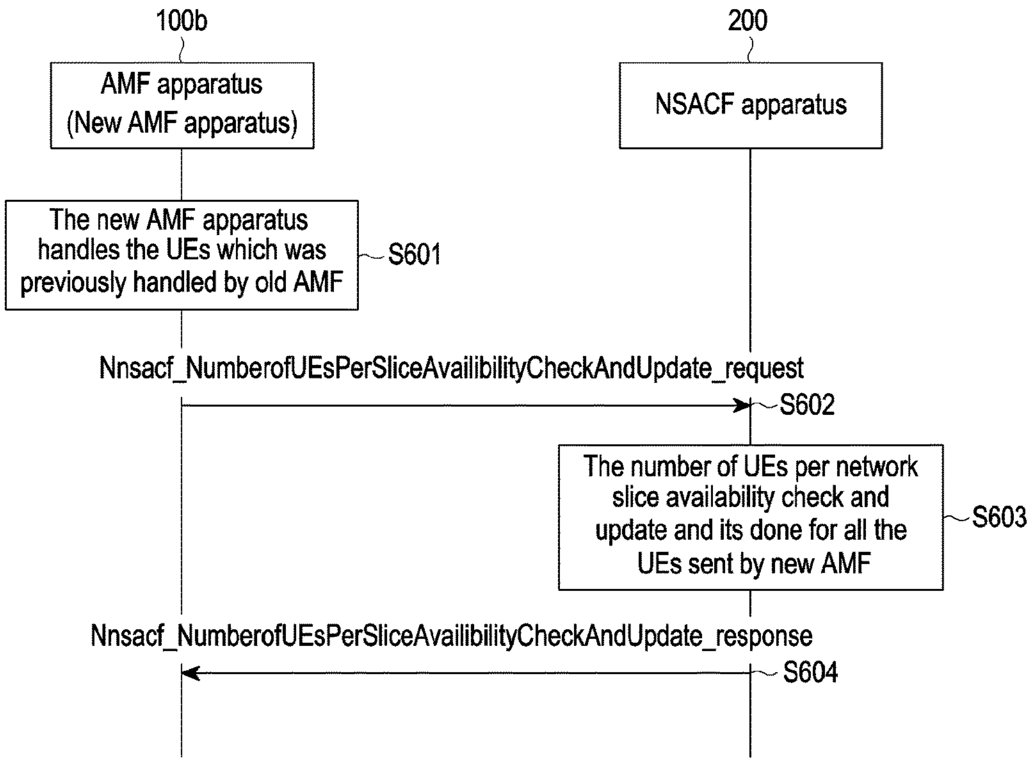

[Fig. 7]
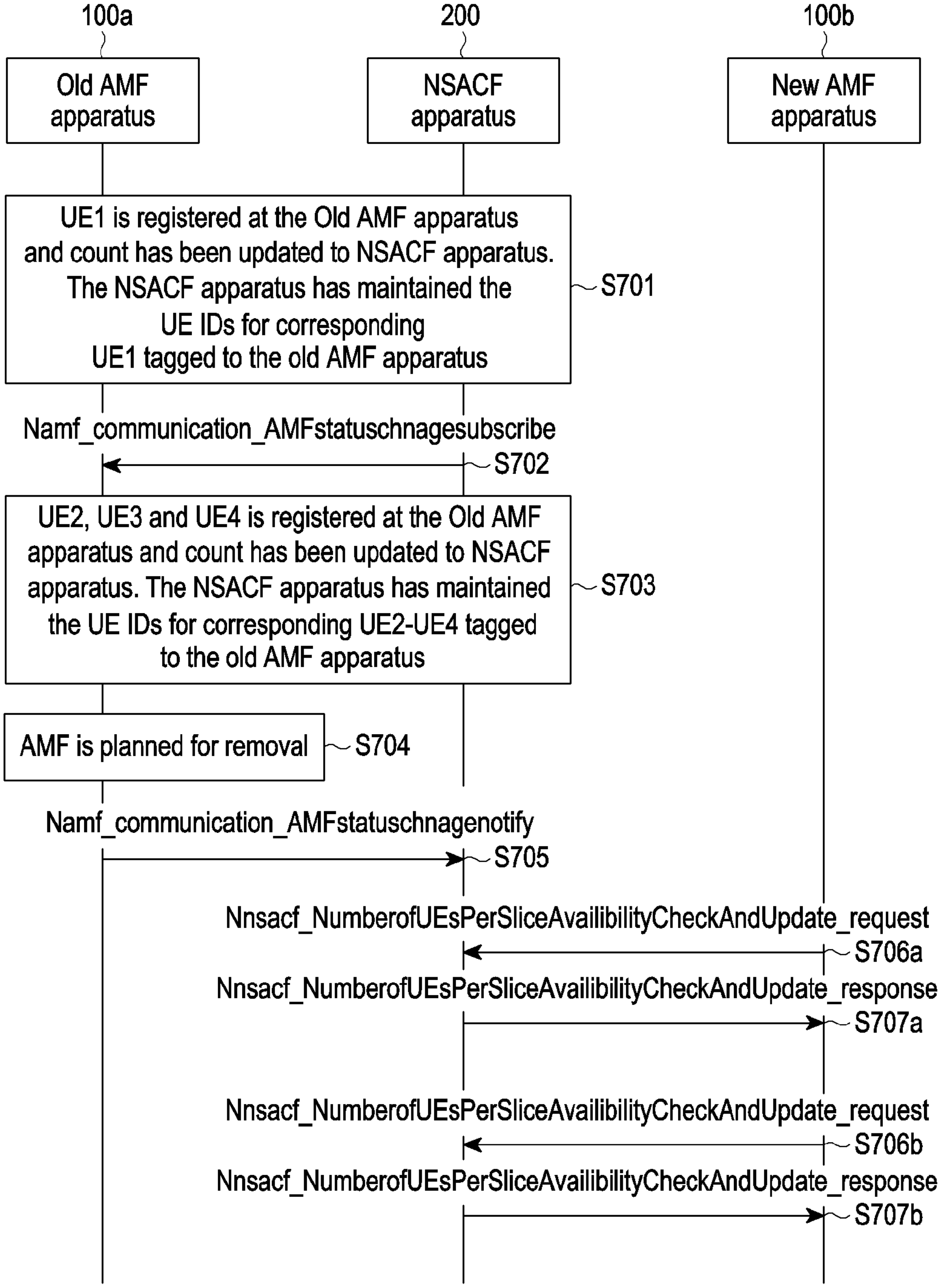

[Fig. 8]
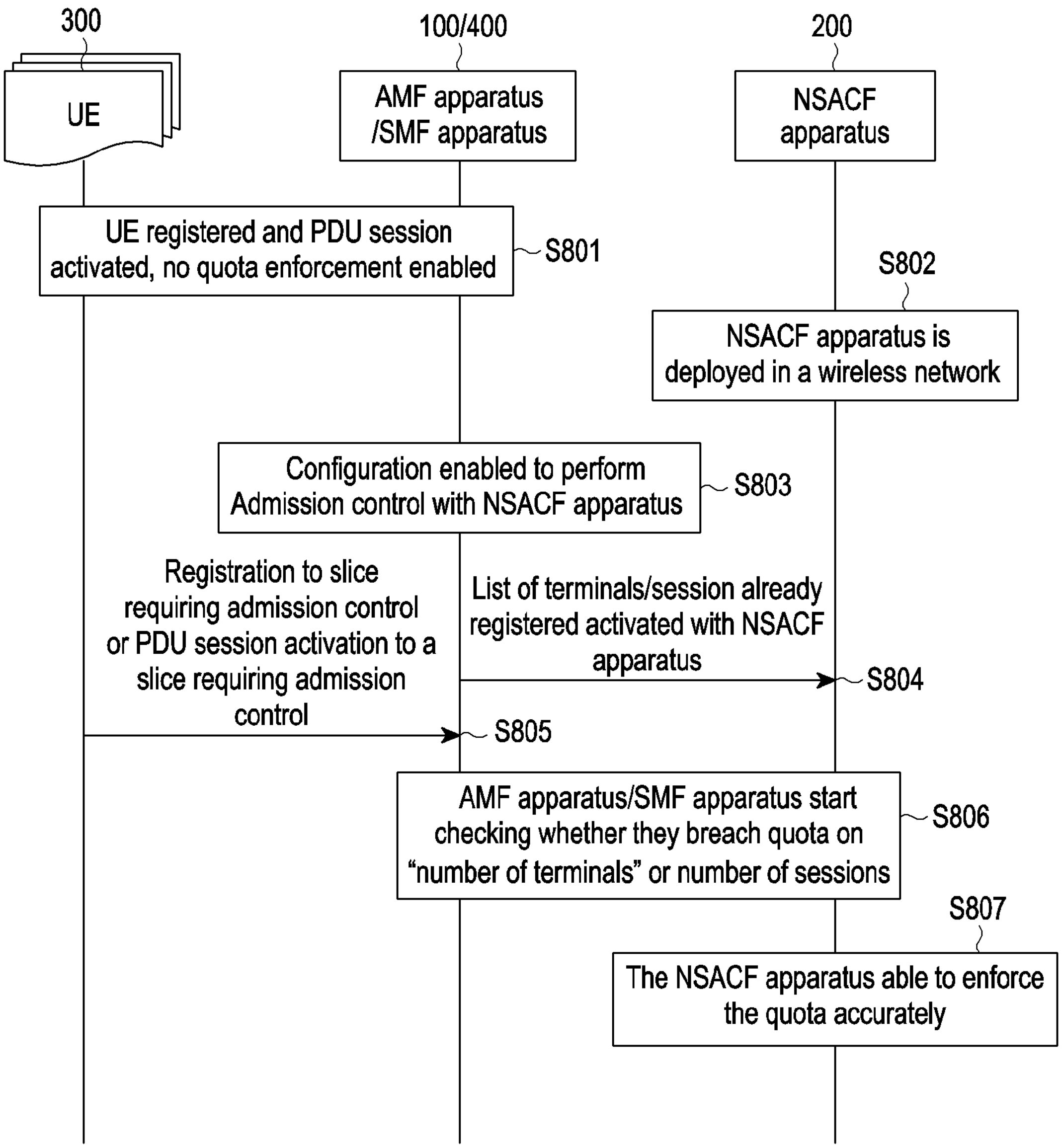

[Fig. 9a]
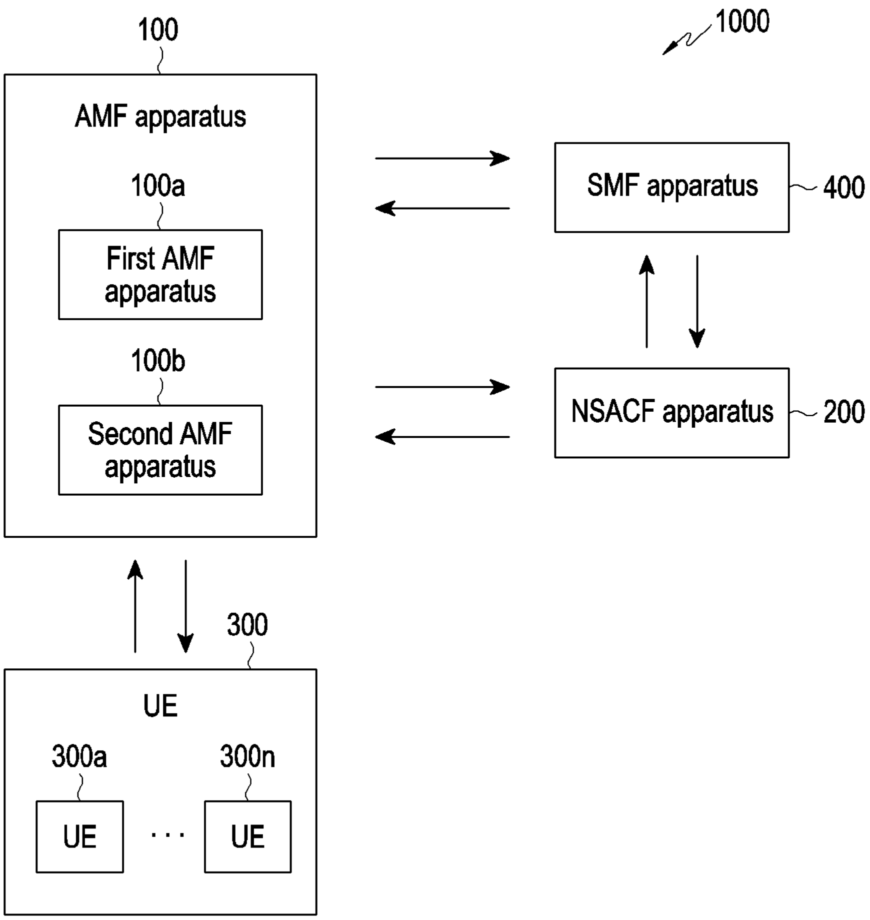
[Fig. 9b]
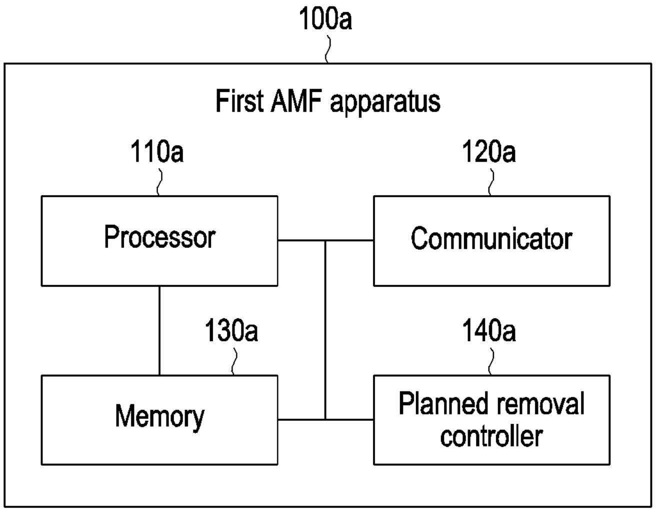

[Fig. 9c]
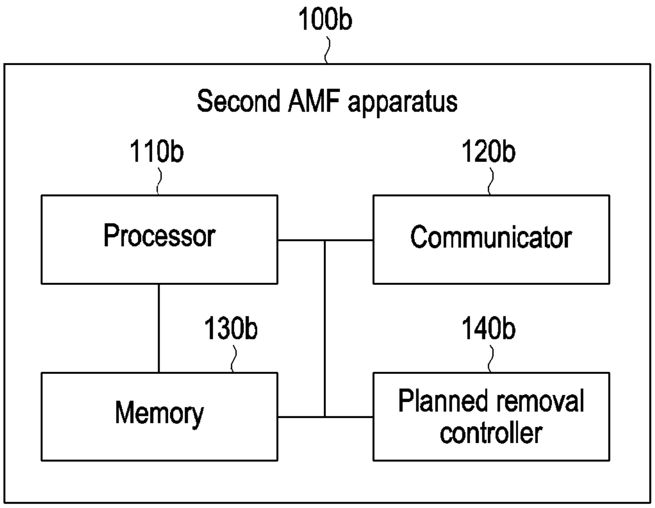
[Fig. 9d]
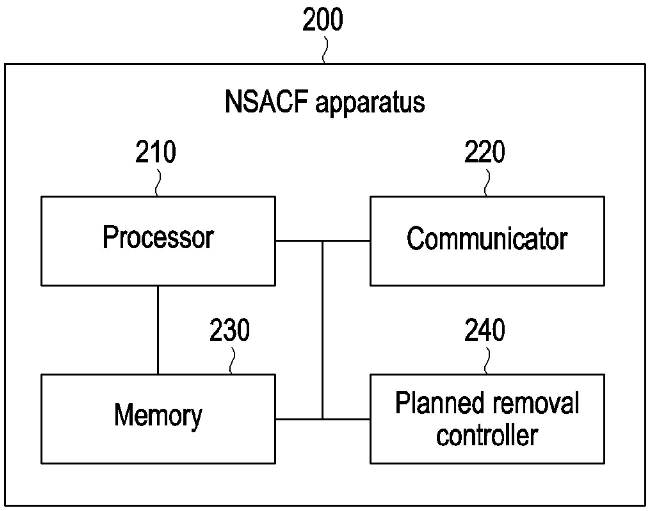
[Fig. 9e]
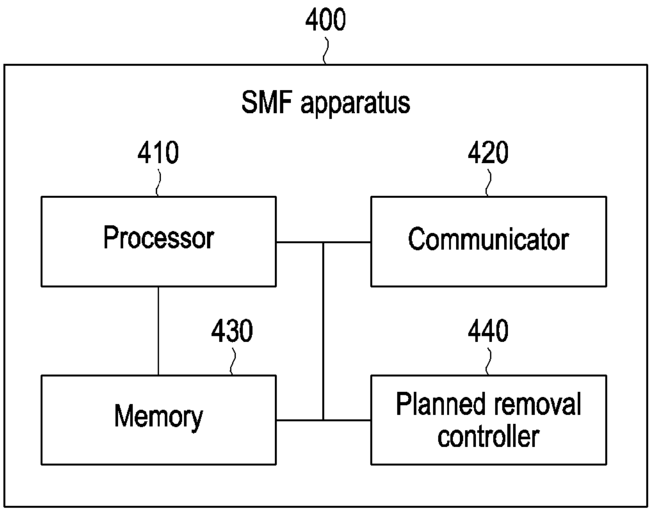

[Fig. 10]
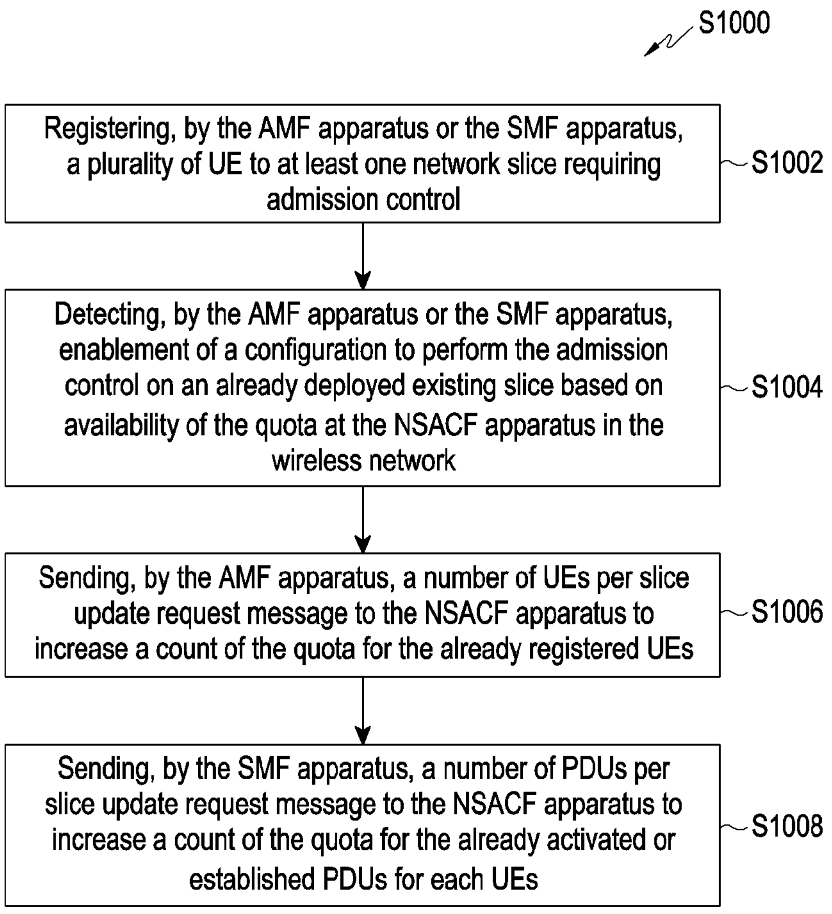

[Fig. 11]
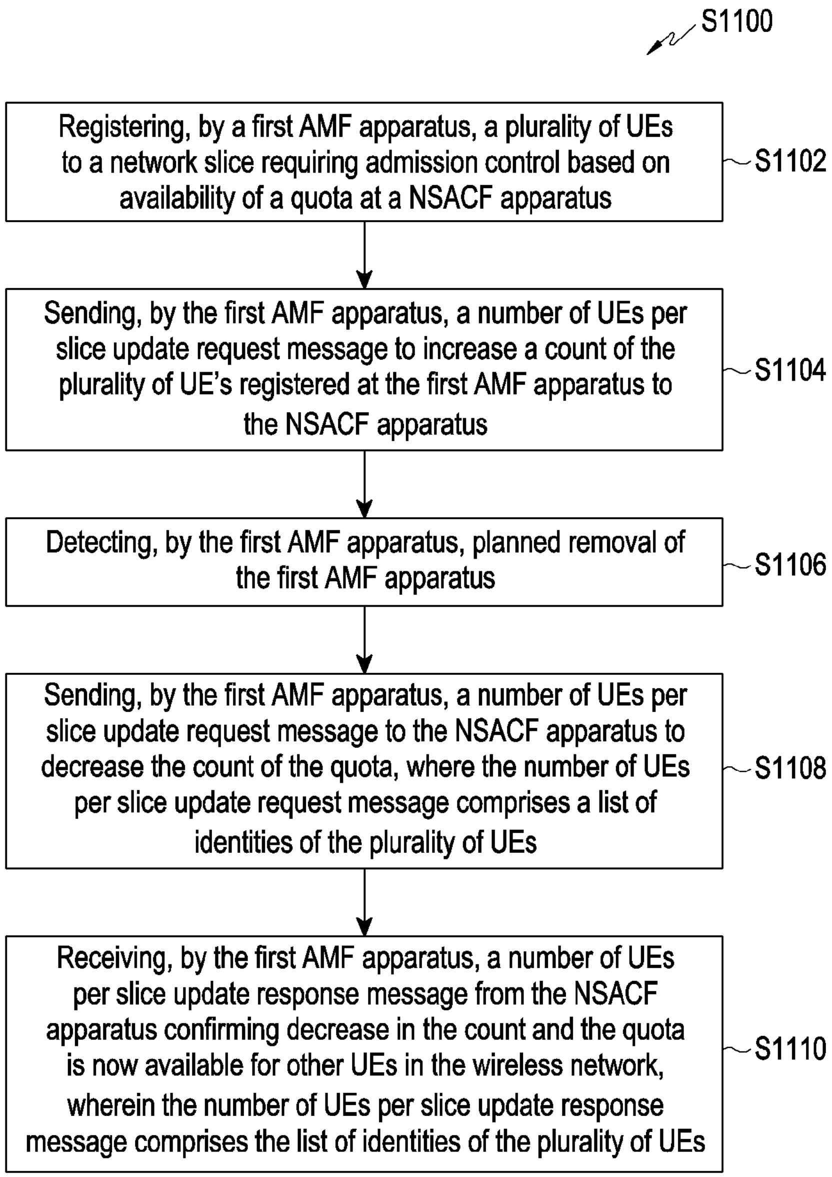

[Fig. 12]
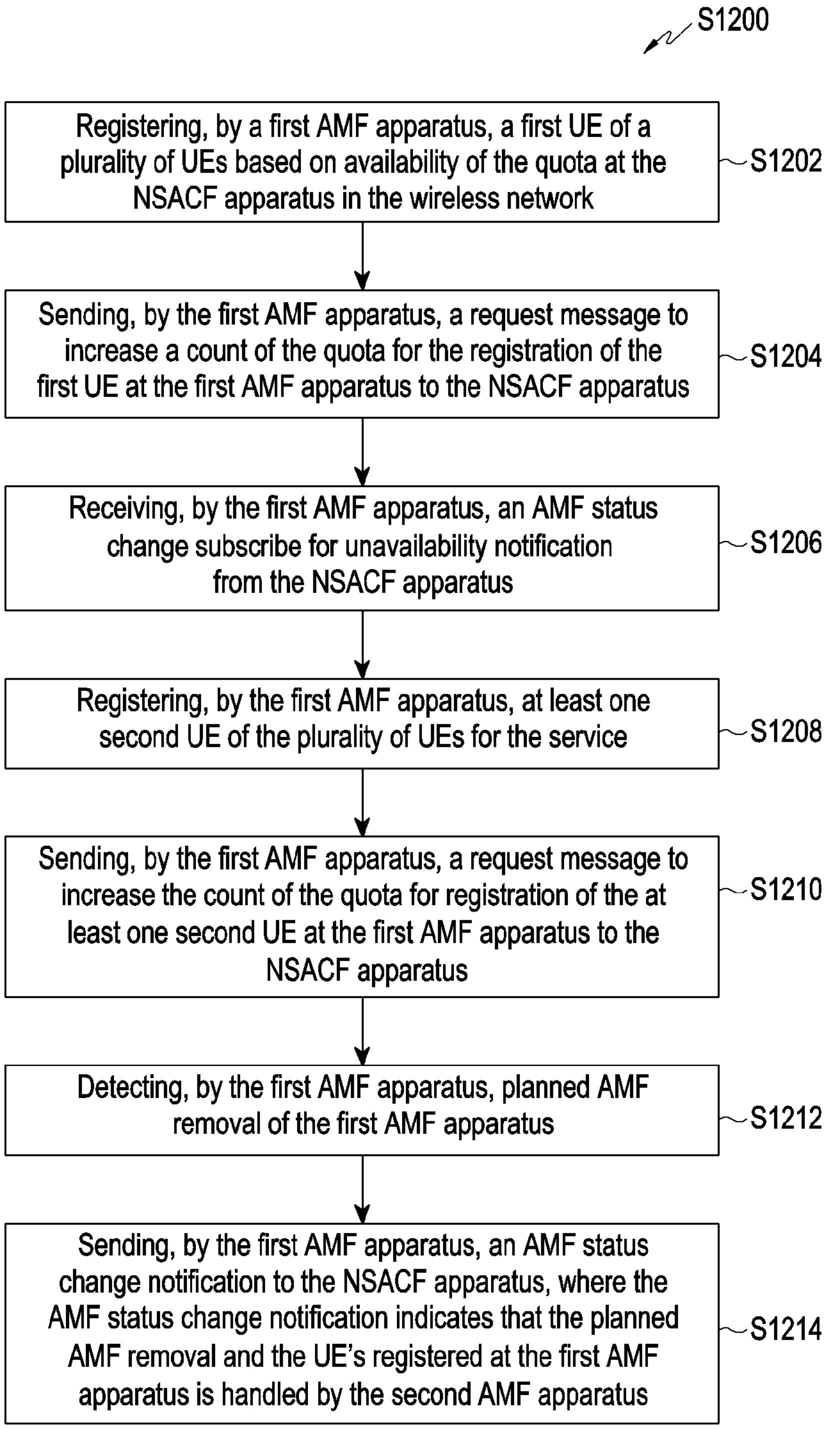

[Fig. 13]
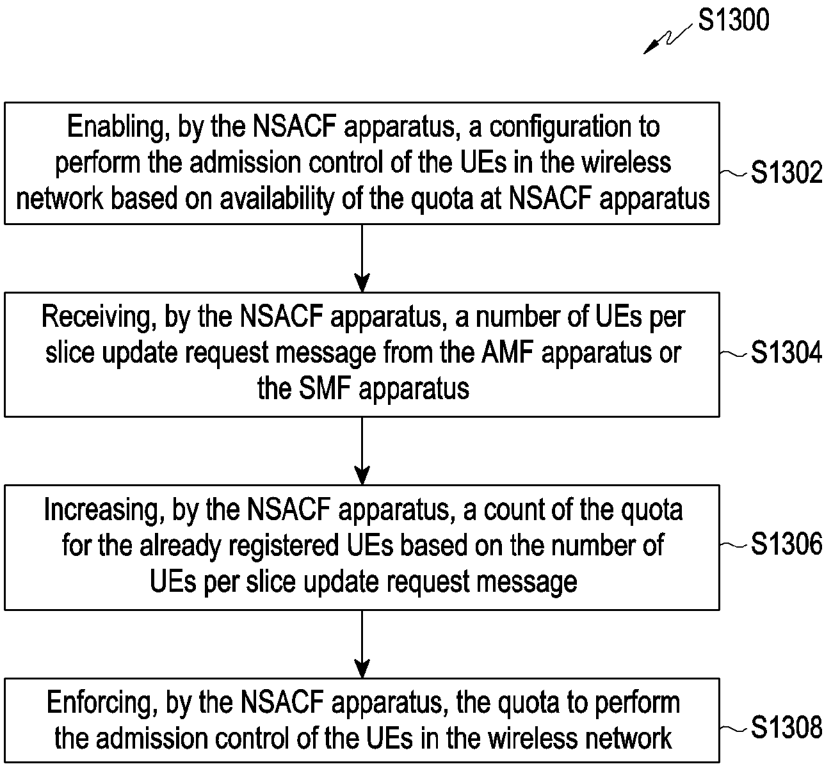

[Fig. 14]
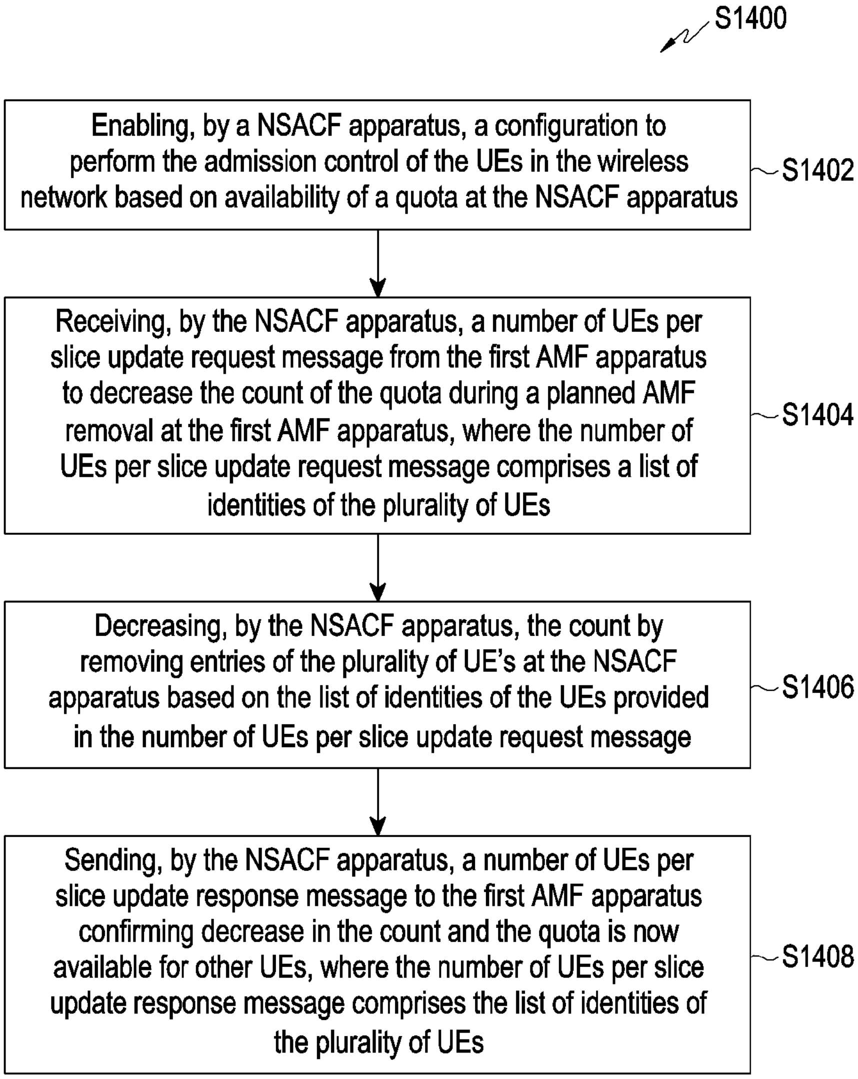

[Fig. 15]
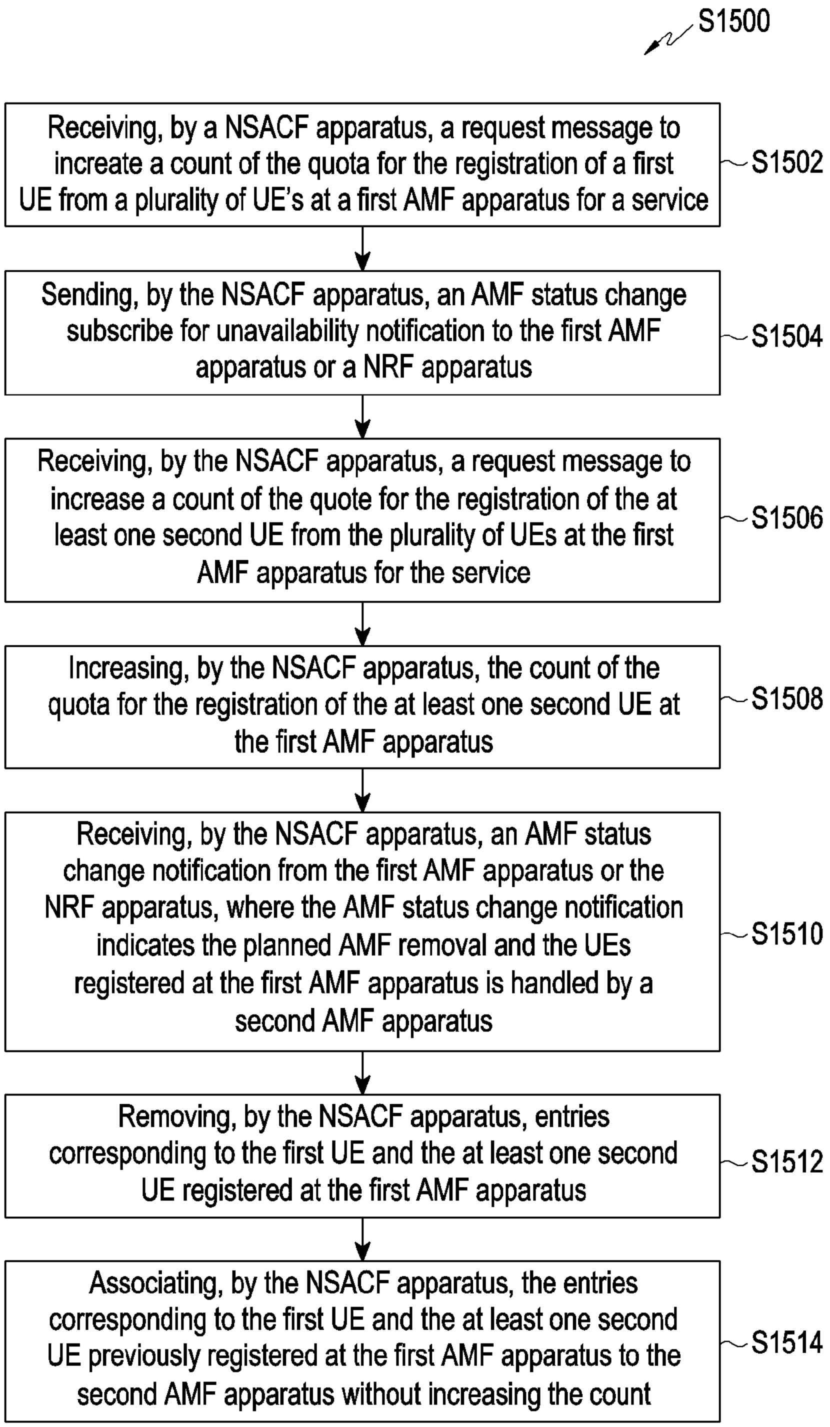

NETWORK SLICE ADMISSION CONTROL BASED ON AVAILABILITY OF QUOTA AT NSACF APPARATUS IN WIRELESS NETWORK

CROSS-REFERENCE TO RELATED APPLICATIONS

This application is a U.S. National Phase Entry of PCT International Application No. PCT/KR2022/006419, which was filed on May 4, 2022, and claims priority to Indian patents application Nos. 202141020557, 202141032700, and 202141020557, which were filed on May 5, 2021, Jul. 20, 2021, and Apr. 26, 2022, respectively, the entire disclosure of each of which is incorporated herein by reference.

TECHNICAL FIELD

The present disclosure relates to a field of network slicing in a 3$^{rd}$ Generation Partnership Project (3GPP), and more particularly related to a method and a wireless network for Network Slice Admission Control (NSAC) based on availability of a quota at a Network Slice Admission Control Function (NSACF) apparatus in the wireless network. This application is based on and derives the benefit of Indian Provisional Application 202141020557 filed on 5 May 2021 and Indian Provisional Application 202141032700 filed on 20 Jul. 2021, the contents of which are incorporated herein by reference.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

The 3GPP release 15 introduced the concept of "Network Slicing" which allows telecom service providers deploy an exclusive network for a customer (e.g. mobile virtual network operator (MVNO), Enterprise) or a service (e.g.

enhanced Mobile Broadband (cMBB), ultra-reliable low latency communications (URLLC), Massive Machine-Type Communications (mMTC)), consisting of multiple network functions designed specifically to support the specialized service. A set of such Network Functions is called "Network Slice", identified using a Single Network Slice Selection Assistance Information (S-NSSAI) inside a 3GPP network.

These slices are characterized by a set of both standard and proprietary attributes as defined by a "slice template". A Global System for Mobile Communications (GSMA) defines a "Generic Network Slice Template" (GST) which provides standardized slice attributes for a set of services supported by the 3GPP. One of the attribute defined by the GST is "Number of Terminals". Attribute "Number of Terminals" describes the maximum number of terminals (UEs) that can use the network slice simultaneously. These are important inputs in network planning, as operators need to make sure that the resources they provide for the network slice are sufficient to handle the capacity specified by these attributes.

In order to enforce these attributes, the 3GPP Rel-17 defines a functional entity "Network Slice Admission Control Function (NSACF)" which monitors and controls the number of User Equipments (UEs) registered to a network slice. The NSACF is configured with the maximum number of UEs per network slice and is expected to be consulted (by AMF) while admitting a UE to the network. This is done for all network slices which are subject to the "quota" defined by these attributes. In the 3GPP terminology, "Number of Terminals" may refer to "Number of UEs" or "Number of Registrations" per access-type.

As specified in the 3GPP TS 23.501 (Rel-17), the NSACF controls (i.e. increases or decreases) the current number of UEs registered for a network slice so that it does not exceed the maximum number of UEs allowed to register with that network slice. The NSACF also maintains a list of UE IDs registered with a network slice that is subject to admission control. When the current number of UEs registered with a network slice is to be increased, the NSACF first checks whether the UE identity is already in the list of UEs registered with that the network slice and if not, it checks whether the maximum number of UEs per network slice for that network slice has already been reached.

The AMF apparatus triggers a request to NSACF apparatus for maximum number of UEs per network slice admission control when the UE's registration status for a network slice subject to the NSAC apparatus may change, i.e., during the UE Registration procedure, UE deregistration procedure or during network slice-specific authentication and authorisation procedures.

It is desired to address the above mentioned disadvantages or other short comings or at least provide a useful alternative.

DISCLOSURE OF INVENTION

Solution to Problem

The principal object of the embodiments herein is to provide a method and a system for handle a Network Slice Admission Control (NSAC) based on availability of a quota at a Network Slice Admission Control Function (NSACF) apparatus in a wireless network.

Another object of the embodiments herein is to handle NSAC during planned AMF removal case in the wireless network.

Another object of the embodiments herein is to ensure that the NSAC is able to accurately maintaining and enforcing the quota on the maximum number of terminals per network slice defined by a Single-Network Slice Selection Assistance Information (S-NSSAI) during the planned AMF removal case.

Another object of the embodiments herein is to update the number of existing registered UEs in the NSACF when NSAC is enabled or disabled for a slice which is already live in the wireless network.

Another object of the embodiments herein is to update the number of existing PDU Sessions in the NSACF when the NSAC is enabled or disabled for a slice which is already live in the network, so as to save huge network resources and avoid the traffic where the AMF apparatus and the SMF apparatus will send a single new service operation to handle multiple register counts and the PDU session counts instead of sending thousands operation one by one.

Accordingly, the embodiment herein is to disclose a method for NSAC based on availability of a quota at a NSACF apparatus in a wireless network. The method includes registering, by a AMF apparatus or a Session Management Function (SMF) apparatus, a plurality of User Equipment's (UE) to at least one network slice requiring admission control. Further, the method includes detecting, by the AMF apparatus or the SMF apparatus, enablement of a configuration to perform the admission control on an already deployed existing slice based on availability of the quota at the NSACF apparatus in the wireless network. Further, the method includes sending, by the AMF apparatus, a number of UEs per slice update request message to the NSACF apparatus to increase a count of the quota for the already registered UEs. Further, the method includes sending, by the SMF apparatus, a number of PDUs per slice update request message to the NSACF apparatus to increase a count of the quota for the already activated or established PDUs for each UEs.

In an embodiment, the method includes detecting, by the AMF apparatus or the SMF apparatus, disablement of the configuration to perform the admission control based on availability of the quota at the NSACF apparatus in the wireless network. Further, the method includes sending, by the AMF apparatus or the SMF apparatus, a number of UEs per slice update request message to the NSACF apparatus to decrease the count of the quota for the already registered UEs and for already activated or established PDUs for each UEs. The number of UEs per slice update request message comprises at least one of: the list of identities of the plurality of UEs that are already registered at the AMF apparatus and the list of corresponding S-NSSAI that require the admission control with the NSACF apparatus, and the list of PDU-Session IDs that are already activated with the SMF apparatus and the list of corresponding S-NSSAI that require the admission control with the NSACF apparatus.

In an embodiment, the plurality of UEs are registered to the at least one network slice requiring admission control with respect to at least one of a number of UEs allowed to be registered and a number of PDU sessions activated on the at least one network slice requiring admission control.

In an embodiment, the number of UEs per slice update request message comprises a list of identities of the plurality of UEs that are already registered at the AMF apparatus and a list of corresponding Single-Network Slice Selection Assistance Information (S-NSSAI) that require the admission control with the NSACF apparatus.

In an embodiment, the number of PDUs per slice update request message comprises a list of PDU-Session IDs that are already activated with the SMF apparatus and a list of corresponding S-NSSAI that require the admission control with the NSACF apparatus.

In an embodiment, the method includes determining, by the first AMF apparatus, planned removal of the AMF apparatus. Further, the method includes sending, by the first AMF apparatus, a number of UEs per slice update request message to the NSACF apparatus to decrease the count of the quota, wherein the number of UEs per slice update request message comprises the list of identities of the plurality of UEs. Further, the method includes receiving, by the first AMF apparatus, a number of UEs per slice update response message from the NSACF apparatus confirming decrease in the count and the quota is available for other UEs, wherein the number of UEs per slice update response message comprises the list of identities of the plurality of UEs.

In an embodiment, the method includes registering, by a second AMF apparatus, the plurality of UEs that are previously registered at the first AMF apparatus when the first AMF apparatus is planned for the removal. Further, the method includes sending, by the second AMF apparatus, a number of UEs per slice update request message to update the NSACF apparatus to increase the count. The number of UEs per slice update request message comprises the list of identities of the plurality of UEs previously registered at the first AMF apparatus. Further, the method includes receiving, by the second AMF apparatus, a number of UEs per slice update response message from the NSACF apparatus confirming increase in the count, wherein the number of UEs per slice update response message comprises the list of identities of the plurality of UEs.

Accordingly, the embodiment herein is to disclose a method for NSAC based on availability of a quota at a NSACF apparatus in a wireless network. The method includes enabling, by the NSACF apparatus, a configuration to perform the admission control of the UEs and admission control of PDUs in the wireless network based on availability of the quota at NSACF apparatus. Further, the method includes receiving, by the NSACF apparatus, a number of UEs per slice update request message from a AMF apparatus or a SMF apparatus. The number of UEs per slice update request message comprises at least one of a list of identities of the plurality of UEs that are already registered at the first AMF apparatus and a list of corresponding S-NSSAI that require the admission control with the NSACF apparatus based on availability of the quota at the NSACF apparatus, and a list of PDU-Session IDs that are already activated with the SMF apparatus and a list of corresponding S-NSSAI that require the admission control with the NSACF apparatus based on availability of the quota at the NSACF apparatus. Further, the method includes increasing, by the NSACF apparatus, a count of the quota for the already registered UEs and for the already activated or established PDUs based on the number of UEs per slice update request message. Further, the method includes enforcing, by the NSACF apparatus, the quota to perform the admission control of the UEs and the admission control of PDUs in the wireless network.

In an embodiment, the method includes disabling, by the NSACF apparatus, the configuration to perform the admission control of the UEs and the admission control of PDUs based on availability of the quota at the NSACF apparatus in the wireless network. Further, the method includes receiving, by the NSACF apparatus, a number of UEs per slice update request message from the AMF apparatus or the SMF apparatus. The number of UEs per slice update request message includes at least one of: the list of identities of the plurality of UEs that are already registered at the AMF apparatus and the list of corresponding S-NSSAI that require the admission control with the NSACF apparatus, and the list of PDU-Session IDs that are already activated with the SMF apparatus and the list of corresponding S-NSSAI that require the admission control with the NSACF apparatus. Further, the method includes decreasing, by the NSACF apparatus, the count of the quota for the already registered UEs and already activated or established PDUs based on the number of UEs per slice update request message.

In an embodiment, the method includes receiving, by the NSACF apparatus, a number of UEs per slice update request message from the first AMF apparatus to decrease the count during a planned AMF removal at the first AMF apparatus. The number of UEs per slice update request message comprises the list of identities of the plurality of UEs. Further, the method includes decreasing, by the NSACF apparatus, the count by removing entries of the plurality of UEs based on the list of identities provided in the number of UEs per slice update request message. Further, the method includes sending, by the NSACF apparatus, a number of UEs per slice update response message to the first AMF apparatus confirming decrease in the count, wherein the number of UEs per slice update response message comprises the list of identities of the plurality of UEs.

Further, the method includes receiving, by the NSACF apparatus, a number of UEs per slice update request message from the second AMF apparatus to increase the count. The number of UEs per slice update request message comprises the list of identities of the plurality of UEs previously registered at the first AMF apparatus. The second AMF apparatus registers the plurality of UEs that are previously registered at the first AMF apparatus when the first AMF apparatus is planned for the removal. Further, the method includes sending, by the NSACF apparatus, a number of UEs per slice update response message to the second AMF apparatus confirming increase in the count. The number of UEs per slice update response message comprises the list of identities of the plurality of UEs.

Accordingly, the embodiment herein is to disclose a method for NSAC based on availability of a quota at a NSACF apparatus in a wireless network. The method includes registering, by a first AMF apparatus, a plurality of UEs to at least one network slice requiring admission control based on availability of a quota at a NSACF apparatus. Further, the method includes sending, by the first AMF apparatus, a number of UEs per slice update request message to increase a count of the plurality of UEs registered at the first AMF apparatus to the NSACF apparatus. Further, the method includes detecting, by the first AMF apparatus, planned removal of the first AMF apparatus. Further, the method includes sending, by the first AMF apparatus, a number of UEs per slice update request message to the NSACF apparatus to decrease the count of the quota, wherein the number of UEs per slice update request message comprises a list of identities of the plurality of UEs. Further, the method includes receiving, by the first AMF apparatus, a number of UEs per slice update response message from the NSACF apparatus confirming decrease in the count and the quota is now available for other UEs in the wireless network, wherein the number of UEs per slice update response message comprises the list of identities of the plurality of UEs.

In an embodiment, further, the method includes registering, by a second AMF apparatus, the plurality of UEs that are previously registered at the first AMF apparatus when the first AMF apparatus is planned for the removal. Further, the method includes sending, by the second AMF apparatus, a number of UEs per slice update request message to the NSACF apparatus to increase the count of the quota, wherein the number of UEs per slice update request message comprises the list of identities of the plurality of UEs previously registered at the first AMF apparatus. Further, the method includes receiving, by the second AMF apparatus, a number of UEs per slice update response message from the NSACF apparatus confirming increase in the count of the quota. The number of UEs per slice update response message comprises the list of identities of the plurality of UEs.

Accordingly, the embodiment herein is to disclose a method for NSAC in a wireless network. The method includes enabling, by a NSACF apparatus, a configuration to perform the admission control of the UEs in the wireless network based on availability of a quota at the NSACF apparatus. Further, the method includes receiving, by the NSACF apparatus, a number of UEs per slice update request message from the first AMF apparatus to decrease the count of the quota during a planned AMF removal at the first AMF apparatus. The number of UEs per slice update request message comprises a list of identities of the plurality of UEs. Further, the method includes decreasing, by the NSACF apparatus, the count by removing entries of the plurality of UEs at the NSACF apparatus based on the list of identities of the UEs provided in the number of UEs per slice update request message. Further, the method includes sending, by the NSACF apparatus, a number of UEs per slice update response message to the first AMF apparatus confirming decrease in the count and the quota is now available for other UEs, wherein the number of UEs per slice update response message comprises the list of identities of the plurality of UEs.

In an embodiment, the method includes receiving, by the NSACF apparatus, a number of UEs per slice update request message from the second AMF apparatus to increase the count. The number of UEs per slice update request message comprises the list of identities of the plurality of UEs previously registered at the first AMF apparatus. The second AMF apparatus registers the plurality of UEs that are previously registered at the first AMF apparatus when the first AMF apparatus is planned for the removal. Further, the method includes increasing, by the NSACF apparatus, the count of the quota based on the number of UEs per slice update request message received from the second AMF apparatus. Further, the method includes sending, by the NSACF apparatus, a number of UEs per slice update response message to the second AMF apparatus confirming increase in the count, wherein the number of UEs per slice update response message comprises the list of identities of the plurality of UEs.

Accordingly, the embodiment herein is to disclose a method for NSAC based on availability of a quota at a NSACF apparatus in a wireless network. The method includes registering, by a first AMF apparatus, a first UE of a plurality of User Equipment's (UEs) based on availability of the quota at the NSACF apparatus in the wireless network. Further, the method includes sending, by the first AMF apparatus, a request message to increase a count of the quota for the registration of the first UE at the first AMF apparatus to the NSACF apparatus. Further, the method includes receiving, by the first AMF apparatus, an AMF status change subscribe for unavailability notification from the NSACF apparatus. Further, the method includes registering, by the first AMF apparatus, at least one second UE of the plurality of UEs for the service. Further, the method includes sending, by the first AMF apparatus, a request message to increase the count of the quota for registration of the at least one second UE at the first AMF apparatus to the NSACF apparatus. Further, the method includes detecting, by the first AMF apparatus, planned AMF removal of the first AMF apparatus. Further, the method includes sending, by the first AMF apparatus, an AMF status change notification to the NSACF apparatus. The AMF status change notification indicates that the planned AMF removal and the UEs registered at the first AMF apparatus is handled by a second AMF apparatus.

Accordingly, the embodiment herein is to disclose a method for NSAC based on availability of a quota at a NSACF apparatus in a wireless network. The method includes receiving, by a NSACF apparatus, request message to increate a count of the quota for the registration of a first UE from a plurality of UEs at a first AMF apparatus for a service. Further, the method includes sending, by the NSACF apparatus, an AMF status change subscribe for unavailability notification to the first AMF apparatus or a Network Repository Function (NRF) apparatus. Further, the method includes receiving, by the NSACF apparatus, a request message to increase a count of the quote for the registration of the at least one second UE from the plurality of UEs at the first AMF apparatus for the service. Further, the method includes increasing, by the NSACF apparatus, the count of the quota for the registration of the at least one second UE at the first AMF apparatus. Further, the method includes receiving, by the NSACF apparatus, an AMF status change notification from the first AMF apparatus or the NRF apparatus, wherein the AMF status change notification indicates the planned AMF removal and the UEs registered at the first AMF apparatus is handled by a second AMF apparatus. Further, the method includes removing, by the NSACF apparatus, entries corresponding to the first UE and the at least one second UE registered at the first AMF apparatus. Further, the method includes associating, by the NSACF apparatus, the entries corresponding to the first UE and the at least one second UE previously registered at the first AMF apparatus to the second AMF apparatus without increasing the count.

In an embodiment, the method includes receiving, by the NSACF apparatus, a number of UEs per slice availability check and update request message from the second AMF apparatus to increase the count of at least one UE of the plurality of UEs previously registered at the first AMF apparatus. The second AMF apparatus registers the at least one UE of the plurality of UEs that are previously registered at the first AMF apparatus when the first AMF apparatus is planned for the removal, the method includes detecting, by the NSACF apparatus, the count the UEs registered at the first AMF apparatus and is already associated with the second AMF apparatus. Further, the method includes sending, by the NSACF apparatus, a number of UEs per slice availability check and update response message to the second AMF apparatus without increasing in the count, wherein the number of UEs per slice update response message comprises a list of identities of the at least one UE.

In an embodiment, the method includes receiving, by the NSACF apparatus, a number of UEs per slice availability check and update request message from the second AMF apparatus to decrease the count of the at least one UE. Further, the method includes detecting, by the NSACF apparatus, that the UE associated with the second AMF apparatus is the only entry in response message to receiving the number of UEs per slice availability check and update request message from the second AMF apparatus. Further, the method includes decreasing, by the NSACF apparatus, the count in response to detecting that the UE associated with the second AMF apparatus is the only entry. Further, the method includes sending, by the NSACF apparatus, a number of UEs per slice availability check and update response message to the second AMF apparatus confirming decrease in the count, wherein the number of UEs per slice update response message comprises a list of identities of the at least one UE.

Accordingly, the embodiment herein is to disclose a wireless network for NSAC based on availability of a quota at NSACF apparatus. The wireless network includes a AMF apparatus or a SMF apparatus configured to register a plurality of UE to at least one network slice requiring admission control, and detect enablement of a configuration to perform the admission control on an already deployed existing slice based on availability of the quota at the NSACF apparatus in the wireless network. The AMF apparatus is configured to send a number of UEs per slice update request message to the NSACF apparatus to increase a count of the quota for the already registered UEs. The SMF apparatus is configured to send a number of PDUs per slice update request message to the NSACF apparatus to increase a count of the quota for the already activated or established PDUs for each UEs.

Accordingly, the embodiment herein is to disclose a NSACF apparatus for NSAC based on availability of a quota at a NSACF apparatus in a wireless network. The NSACF apparatus includes a planned removal controller coupled with a processor and a memory. The planned removal controller is configured to enable a configuration to perform the admission control of the UEs and the admission control of PDUs in the wireless network based on availability of the quota at NSACF apparatus. Further, the planned removal controller is configured to receive a number of UEs per slice update request message from a AMF apparatus or a SMF apparatus. The number of UEs per slice update request message comprises at least one of a list of identities of the plurality of UEs that are already registered at the AMF apparatus and a list of corresponding S-NSSAI that require the admission control with the NSACF apparatus based on availability of the quota at the NSACF apparatus, and a list of PDU-Session IDs that are already activated with the SMF apparatus and a list of corresponding S-NSSAI that require the admission control with the NSACF apparatus based on availability of the quota at the NSACF apparatus. Further, the planned removal controller is configured to increase a count of the quota for the already registered UEs and already activated or established PDUs based on the number of UEs per slice update request message. Further, the planned removal controller is configured to enforce the quota to perform the admission control of the UEs and the admission control of PDUs in the wireless network.

Accordingly, the embodiment herein is to disclose a wireless network for NSAC based on availability of a quota at a NSACF apparatus. The wireless network comprises a first AMF apparatus having a planned removal controller coupled with a processor and a memory. The planned removal controller is configured to register a plurality of UE to at least one network slice requiring admission control based on availability of a quota at a NSACF apparatus. Further, the planned removal controller is configured to send a number of UEs per slice update request message to increase a count of the plurality of UEs registered at the first AMF apparatus to the NSACF apparatus. Further, the planned removal controller is configured to detect planned removal of the first AMF apparatus. Further, the planned removal controller is configured to send a number of UEs per slice update request message to the NSACF apparatus to decrease the count of the quota. The number of UEs per slice update request message comprises a list of identities of the plurality of UEs. Further, the planned removal controller is configured to receive a number of UEs per slice update response message from the NSACF apparatus confirming decrease in the count and the quota is now available for other UEs in the wireless network, wherein the number of UEs per slice update response message comprises the list of identities of the plurality of UEs.

Accordingly, the embodiment herein is to disclose a NSACF apparatus for NSAC in a wireless network. The NSACF apparatus includes a planned removal controller coupled with a processor and a memory. The planned removal controller is configured to enable a configuration to perform the admission control of the UEs in the wireless network based on availability of a quota at the NSACF apparatus. Further, the planned removal controller is configured to receive a number of UEs per slice update request message from the first AMF apparatus to decrease the count of the quota during a planned AMF removal at the first AMF apparatus. The number of UEs per slice update request message comprises a list of identities of the plurality of UEs. Further, the planned removal controller is configured to decrease the count by removing entries of the plurality of UEs at the NSACF apparatus based on the list of identities of the UEs provided in the number of UEs per slice update request message. Further, the planned removal controller is configured to send a number of UEs per slice update response message to the first AMF apparatus confirming decrease in the count and the quota is now available for other UEs, wherein the number of UEs per slice update response message comprises the list of identities of the plurality of UEs.

Accordingly, the embodiment herein is to disclose a first AMF apparatus for NSAC based on availability of a quota at a NSACF apparatus in a wireless network. The first AMF apparatus includes a planned removal controller coupled with a processor and a memory. The planned removal controller is configured to register a first UE of a plurality of UEs based on availability of the quota at the NSACF apparatus in the wireless network. Further, the planned removal controller is configured to send a request message to increase a count of the quota for the registration of the first UE at the first AMF apparatus to the NSACF apparatus. Further, the planned removal controller is configured to receive an AMF status change subscribe for unavailability notification from the NSACF apparatus. Further, the planned removal controller is configured to register at least one second UE of the plurality of UEs for the service. Further, the planned removal controller is configured to send a request message to increase the count of the quota for registration of the at least one second UE at the first AMF apparatus to the NSACF apparatus. Further, the planned removal controller is configured to detect planned AMF removal of the first AMF apparatus. Further, the planned removal controller is configured to send an AMF status change notification to the NSACF apparatus, wherein the AMF status change notification indicates that the planned AMF removal and the UEs registered at the first AMF apparatus is handled by a second AMF apparatus.

Accordingly, the embodiment herein is to disclose a NSACF apparatus for NSAC based on availability of a quota at a NSACF apparatus in a wireless network. The NSACF apparatus includes a planned removal controller coupled with a processor and a memory. The planned removal controller is configured to receive a request message to increate a count of the quota for the registration of a first UE from a plurality of UEs at a first AMF apparatus for a service. Further, the planned removal controller is configured to send an AMF status change subscribe for unavailability notification to the first AMF apparatus or a Network Repository Function (NRF) apparatus. Further, the planned removal controller is configured to receive a request message to increase a count of the quote for the registration of the at least one second UE from the plurality of UEs at the first AMF apparatus for the service. Further, the planned removal controller is configured to increase the count of the quota for the registration of the at least one second UE at the first AMF apparatus. Further, the planned removal controller is configured to receive an AMF status change notification from the first AMF apparatus or the NRF apparatus, wherein the AMF status change notification indicates the planned AMF removal and the UEs registered at the first AMF apparatus is handled by a second AMF apparatus. Further, the planned removal controller is configured to remove entries corresponding to the first UE and the at least one second UE registered at the first AMF apparatus. Further, the planned removal controller is configured to associate the entries corresponding to the first UE and the at least one second UE previously registered at the first AMF apparatus to the second AMF apparatus without increasing the count.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 illustrating a scenario of old AMF behaviour during planned AMF removal scenario with existing service operation (steps repeated for all the UEs registered at the old AMF apparatus), according to the related arts;

FIG. 2 illustrating a scenario of new AMF behaviour during planned AMF removal scenario with existing service operation (steps repeated for all the UEs which was earlier handled by the old AMF apparatus), according to the related arts;

FIG. 3 illustrating another scenario of new AMF behaviour during planned AMF removal scenario with existing service operation (steps repeated for all the UEs which was earlier handled by old AMF), according to the related arts;

FIG. 4 illustrates a sequence diagram illustrating a method for handling admission control at the NSACF apparatus, according to related arts;

FIG. 5 illustrating an example scenario of old AMF behaviour during planned AMF removal scenario with new single service operation, according to the embodiments enclosed herein;

FIG. 6 illustrating an example scenario of new AMF behaviour during planned AMF removal scenario with new single service operation, according to the embodiments enclosed herein; and FIG. 7 illustrating an example scenario of new AMF behaviour during planned AMF removal scenario with new single service operation based on an AMF status change notification, according to the embodiments enclosed herein.

FIG. 8 illustrates a sequence diagram illustrating a method for handling admission control at the NSACF apparatus, according to the embodiments enclosed herein;

FIG. 9*a* illustrates an overview of a wireless network for handling a NSAC during planned AMF removal case, according to the embodiments enclosed herein;

FIG. 9*b* shows various hardware components of a first AMF apparatus, according to an embodiment as disclosed herein;

FIG. 9*c* shows various hardware components of a second AMF apparatus, according to an embodiment as disclosed herein;

FIG. 9*d* shows various hardware components of a NSACF apparatus, according to an embodiment as disclosed herein;

FIG. 9*c* shows various hardware components of a SMF apparatus, according to an embodiment as disclosed herein;

FIG. 10 is a flow chart illustrating a method, implemented by the AMF apparatus or the SMF apparatus, for NSAC based on availability of the quota at the NSACF apparatus in the wireless network, according to the embodiments enclosed herein;

FIG. 11 is a flow chart illustrating a method, implemented by the first AMF apparatus, for NSAC based on availability of the quota at the NSACF apparatus in the wireless network, according to the embodiments enclosed herein;

FIG. 12 is a flow chart illustrating a method, implemented by the first AMF apparatus, for NSAC based on availability of the quota at the NSACF apparatus in the wireless network using an AMF status change notification, according to the embodiments enclosed herein;

FIG. 13 is a flow chart illustrating a method, implemented by the NSACF apparatus, for NSAC based on availability of the quota at the NSACF apparatus in the wireless network using the number of UEs per slice update request message, according to the embodiments enclosed herein;

FIG. 14 is a flow chart illustrating a method, implemented by the NSACF apparatus, for NSAC based on availability of the quota at the NSACF apparatus in the wireless network using the number of UEs per slice update request message including the list of identities of the plurality of UEs, according to the embodiments enclosed herein;

FIG. 15 is a flow chart illustrating a method, implemented by the NSACF apparatus, for NSAC based on availability of the quota at the NSACF apparatus in the wireless network using an AMF status change notification, according to the embodiments enclosed herein;

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Below are the abbreviations used in the description:

AMF—Access and Mobility Management Function

UE—User Equipment

NSACF—Network Slice Admission Control Function

3gpp—3rd Generation Partnership Project

NSSAI—Network Slice Selection Assistance Information

S-NSSAI—Single-Network Slice Selection Assistance Information

Accordingly, the embodiment herein is to provide a for NSAC based on availability of a quota at a NSACF apparatus in a wireless network. The method includes registering, by a AMF apparatus or a SMF apparatus, a plurality of UEs to at least one network slice requiring admission control. Further, the method includes detecting, by the AMF apparatus or the SMF apparatus, enablement of a configuration to perform the admission control on an already deployed existing slice based on availability of the quota at the NSACF apparatus in the wireless network. Further, the method includes sending, by the AMF apparatus, a number of UEs per slice update request message to the NSACF apparatus to increase a count of the quota for the already registered UEs. Further, the method includes sending, by the SMF apparatus, a number of PDUs per slice update request message to the NSACF apparatus to increase a count of the quota for the already activated or established PDUs for each UEs.

Unlike conventional methods and systems, the method can be used to handle the NSAC during the planned AMF removal with less number of signalling in the wireless network. The method can ensure that the NSAC is able to accurately maintaining and enforcing the quota on the maximum number of terminals per network slice defined by the S-NSSAI during planned AMF removal case without resource wastages.

The proposed method can be used to update the number of existing registered UEs in the NSACF when NSAC is enabled or disabled for a slice which is already live in the wireless network. The proposed method can be used to update the number of existing PDU Sessions in the NSACF apparatus when the NSAC is enabled or disabled for a slice which is already live in the network so as to save huge network resources and avoid the traffic where the AMF apparatus and the SMF apparatus will send a single new service operation to handle multiple register counts and the PDU session counts instead of sending thousands operation one by one.

Referring now to the drawings and more particularly to FIGS. 5 through 15, where similar reference characters denote corresponding features consistently throughout the figures, there are shown preferred embodiments.

The 3GPP has already addressed one scenario where for a single UE there are more entries present temporarily in the NSACF. The use case of having two or more entries temporarily in the NSACF for the same UE can happen during (a) inter-AMF mobility when there is no UE context transfer and the UE requests to register with S-NSSAI(s) subject to NSAC already used in the old AMF or (b) registration public data network (PDN) connections with the Evolved Packet Core (EPC) when multiple Session Management Function (SMF)+PGW-Cs send update requests for maximum number of UEs to the NSACF. In this case each entries for the same UE ID are differentiated by NF ID which has sent the requests. NSACF will decrease the entries when it receives the request with update flag to decrease from the associated NF IDs.

But in case of planned AMF removal when one of the AMF is taken graciously out of service, then different AMF(s) from the AMF set will take the role of new AMF and handle the UEs which was previously done by the old (planned removal) AMF. If the new AMF cannot be assigned from AMF set, then a different AMF will be selected. The NSAC procedure for these scenario is not yet handled in the 3GPP, specifically how the old AMF can request to decrease the count to NSACF about the already registered UEs and the new AMF will request to increase the count.

FIG. 1 illustrating a scenario of old AMF behaviour during planned AMF removal scenario with existing service operation (steps repeated for all the UEs registered at old AMF apparatus), according to the related arts.

Referring to the FIG. 1 consider a conventional methods and systems, is a representation of a sequence of events of old AMF behaviour that is expected to take place in a typical network deployment where above features are deployed for the planned AMF removal use case. The steps are as follows:

S101: As per the existing 3GPP procedures UEs have been registered at the old AMF apparatus (100). The NSACF apparatus (200) has already updated the UE IDs tagged to this NF ID (old AMF ID).

S102: The Old AMF apparatus (100) is planned for to be taken out of service.

S103: The Old AMF apparatus (100) started using the existing service operation defined by the 3GPP which is per UE to update the NSACF apparatus (200) to decrease the count. This step is repeated by the Old AMF apparatus (100) for all the registered UEs.

S104: The NSACF (200) checks and as per the existing procedures it decreases the UE count and remove the UE ID. It does for all the UEs for which request is sent by the old AMF apparatus (100).

S105: The NSACF apparatus (200) updates to the old AMF apparatus (100). This response is provided for all the UEs FIG. 2 illustrating a scenario of new AMF behaviour during planned AMF removal scenario with existing service operation (steps repeated for all the UEs which was earlier handled by old AMF), according to the related arts.

Referring to the FIG. 2 consider a conventional methods and systems, is a representation of a sequence of events of new AMF behaviour that is expected to take place in a typical network deployment where above features are deployed for the planned AMF removal use case. The steps are as follows:

S201: As per the existing 3GPP procedures new AMF apparatus (100) is assigned to handle the UEs previously handled by the old AMF apparatus.

S202: The new AMF apparatus (100) started using the existing service operation defined by the 3GPP which is per UE to update the NSACF apparatus (200) to increase the count. This step is repeated by new AMF apparatus (100) for all the UEs.

S203: The NSACF apparatus (200) checks and as per the existing procedures it increases the UE count and add the UE ID. It does for all the UEs for which request is sent by the new AMF apparatus (100).

S204: The NSACF apparatus (200) updates to the new AMF apparatus (100). This response is provided for all the UEs.

FIG. 3 illustrating a scenario of new AMF behaviour during planned AMF removal scenario with existing service operation (steps repeated for all the UEs which was earlier handled by old AMF), according to the related arts.

At S301, the first UE, the second UE, the third UE and the fourth UE are registered at the Old AMF apparatus (100*a*) and count has been updated to the NSACF apparatus (200). The NSACF apparatus (200) has maintained the UE IDs for corresponding UE1-UE4 tagged to the old AMF apparatus. At S302, the AMF is planned for removal. At S303*a* and S303*b*, the new AMF apparatus (100*b*) sends a Nnsacf_NumberofUEsPerSliceAvailibilityCheckAndUpdate_request to the NSACF apparatus (200). At S304*a* and S304*b*, the NSACF apparatus (200) sends the Nnsacf_NumberofUEsPerSliceAvailibilityCheckAndUpdate_response to the new AMF apparatus (100*b*). But, the NSACF apparatus (200) does not aware removal of the old AMF apparatus (100*a*). Hence, as per the existing procedures, the NSACF apparatus (200) create an entry for the first UE by tagging to the new AMF apparatus (100*b*) and keep the existing entry of the old AMF apparatus (100*a*). Also, the NSACF apparatus (200) removes the new entry but still not decrease the count of the existing entry of the old AMF apparatus (100*a*).

FIG. 4 illustrates a sequence diagram illustrating a method for handling admission control at the NSACF apparatus, according to related arts.

At S401, the UE (100) is registered and PDU session activated, no quota enforcement enabled. At S402, the NSACF apparatus (200) is deployed in the wireless network. At S403, in the AMF apparatus (100)/SMF apparatus (400), the configuration enabled to perform admission control with the NSACF apparatus (200). At S404, the UE (300) sends the registration to slice requiring admission control or PDU session activation to the slice requiring admission control. At S405, the AMF apparatus (100)/the SMF apparatus (400) starts checking whether they breach quota on "number of terminals" or number of sessions. At S406, since the NSACF apparatus (200) does not know the number of session/terminals allowed before step S402, the NSACF apparatus (200) fails to enforce the quota accurately.

Unlike to the conventional methods and systems, the proposed method is trying to address the problem explained which occurs during planned removal AMF scenario. Here it is impossible for old AMF (planned AMF to be removed) to request the NSACF apparatus (200) to decrease the count for thousand(s) of registered UEs using the existing service operation which is designed per single UE. Hence the proposed method proposes to create a new service operation which can be used to update the request for more number of UEs.

FIG. 5 illustrating an example scenario of old AMF behaviour during planned AMF removal scenario with new single service operation, according to the embodiments enclosed herein.

Unlike to the conventional methods and systems, referring to the FIG. 5 consider a proposed method, is a representation of a sequence of events of old AMF behaviour that is expected to take place in a typical network deployment where above features are deployed for the planned AMF removal use case.

In comparison to the FIG. 1, step S103 and step S105 are not being repeated for each UEs. The objective is fulfilled using a new service operation which improves the number of signalling messages handled in network.

Similarly, when the new AMFs handle the UEs, it can use the proposed new service operation to request the NSACF to increase the count which was previously handled by old AMFs.

Referring to the FIG. 5, at S501, the UEs are already registered at the old AMF apparatus (100*a*) and count has been updated to the NSACF apparatus (200). The NSACF apparatus (200) has maintained the UE IDs tagged to the old AMF apparatus. At S502, the AMF apparatus is planned for removal. At S503, the old AMF apparatus (100*a*) sends a Nnsacf_NumberofUEsPerSliceAvailibilityCheckAndUpdate_request to the NSACF apparatus (200). At S504, the number of UEs per network slice availability check and update for all the UEs sent by the AMF apparatus (100*a*). At S505, the NSACF apparatus (200) sends a Nnsacf_NumberofUEsPerSliceAvailibilityCheckAndUpdate_response to the old AMF apparatus (100*a*).

FIG. 6 illustrating an example scenario of new AMF behaviour during planned AMF removal scenario with new single service operation, according to the embodiments enclosed herein.

Referring to the FIG. 6 consider a proposed method, is a representation of a sequence of events of new AMF behaviour that is expected to take place in a typical network deployment where above features are deployed for the planned AMF removal use case according embodiments enclosed herein.

In comparison to the FIG. 2, step S202 and step S204 are not being repeated for each UEs. The objective is fulfilled using a new service operation which improves the no of signalling messages handled in network.

In an embodiment, it is proposed that when the AMF is planned for removal, then it uses a new service operation to update the NSACF to decrease the count for the already registered UEs by sending list of UE IDs.

In an embodiment, it is proposed that when a new AMF (without UDSF deployment) is assigned to handle the UEs which was previously handled by old (planned removal) AMF for removal, then it uses a new service operation to update the NSACF to increase the count for the already registered UEs by sending list of UE IDs.

In an embodiment, it is proposed that NSACF subscribe to the AMF unavailability. When NSACF is notified by the new AMF with the new GUAMI, after planned AMF is removed from the network, it replaces the old GUAMI with new GUAMI for the tagged UE IDs.

Referring to the FIG. 6, At S601, the new AMF apparatus (100*b*) handles the UEs which were previously handled by the new AMF apparatus. At S602, the new AMF apparatus (100*b*) sends a Nnsacf_NumberofUEsPerSliceAvailibility-CheckAndUpdate_request to the NSACF apparatus (200). At S603, the number of UEs per network slice availability check and update and its done for all the UEs sent by new AMF apparatus (100*b*). At S604, the NSACF apparatus (200) sends a Nnsacf_NumberofUEsPerSliceAvailibility-CheckAndUpdate_response to the new AMF apparatus.

FIG. 7 illustrating an example scenario of new AMF behaviour during planned AMF removal scenario with new single service operation based on an AMF status change notification, according to the embodiments enclosed herein.

Referring to the FIG. 7, at S701, the UE1 is registered at the Old AMF apparatus (100*a*) and count has been updated to the NSACF apparatus (200). The NSACF apparatus (200) has maintained the UE IDs for corresponding UE1 tagged to the old AMF apparatus (100*a*). At S702, the NSACF apparatus (200) sends a Namf_communication_AMFstatuschnagesubscribe to the old AMF apparatus (100*a*). At S703, the UE2, UE3 and UE4 are registered at the old AMF apparatus (100*a*) and count has been updated to the NSACF apparatus (200). The NSACF apparatus (200) has maintained the UE IDs for corresponding UE2-UE4 tagged to the old AMF apparatus (100*a*). At S704, the AMF is planned for removal. At S705, the NSACF apparatus (200) sends a Namf_communication_AMFstatuschnagenotify to the old AMF apparatus (100*a*). At S706*a*, S706*b*, the new AMF apparatus (100*b*) sends a Nnsacf_NumberofUEsPerSliceAvailibilityCheckAndUpdate_request to the NSACF apparatus (200). At S707*a*, S707*b* the NSACF apparatus (200) sends the Nnsacf_NumberofUEsPerSliceAvailibilityCheckAndUpdate_response to the new AMF apparatus (100*b*). Based on the Namf_communication_AMFstatuschnagenotify, the NSACF apparatus (200) removes the entries corresponding to the first UE.

FIG. 8 illustrates a sequence diagram illustrating a method for handling admission control at the NSACF apparatus, according to according to the embodiments enclosed herein. At S801, the UE (100) is registered and PDU session activated, no quota enforcement enabled. At S802, the NSACF apparatus (200) is deployed in the wireless network. At S803, in the AMF apparatus (100)/SMF apparatus (400), the configuration enabled to perform admission control with the NSACF apparatus (200). At S804, the AMF apparatus (100)/SMF apparatus (400) sends the list of terminals/session already registered activated with the NSACF apparatus (200). At S805, the UE (300) sends the registration to slice requiring admission control or PDU session activation to the slice requiring admission control. At S806, the AMF apparatus (100)/the SMF apparatus (400) starts checking whether they breach quota on "number of terminals" or number of sessions. At S807, the NSACF apparatus (200) can able to enforce the quota accurately.

FIG. 9*a* illustrates an overview of the wireless network (1000) for handling the NSAC during planned AMF removal, according to the embodiments enclosed herein. In an embodiment, the wireless network (1000) includes a first AMF apparatus (100*a*), a second AMF apparatus (100*b*), a NSACF apparatus (200), a plurality of UE (300) and a SMF apparatus (400). The wireless network (1000) can be, for example, but not limited to a 4G network, a 5G network, a 6G network and an O-RAN network. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device.

The AMF apparatus (100*a*) or the SMF apparatus (400) is configured to register a plurality of UEs (300) to the network slice requiring admission control. The first AMF apparatus (100*a*) or the SMF apparatus (400) is configured to detect enablement of the configuration to perform the admission control on an already deployed existing slice based on availability of the quota at the NSACF apparatus (200) in the wireless network (1000). The AMF apparatus (100*a*) is configured to send a number of UEs per slice update request message to the NSACF apparatus (200) to increase a count of the quota for the already registered UEs (300). The SMF apparatus (400) is configured to send a number of PDUs per slice update request message to the NSACF apparatus (200) to increase a count of the quota for the already activated or established PDUs for each UEs.

Further, the AMF apparatus (100*a*) or the SMF apparatus (400) is configured to detect disablement of the configuration to perform the admission control based on availability of the quota at the NSACF apparatus (200) in the wireless network (1000). Further, the AMF apparatus (100*a*) or the SMF apparatus (400) is configured to send a number of UEs per slice update request message to the NSACF apparatus (200) to decrease the count of the quota for the already registered UEs (300). The number of UEs per slice update request message includes at least one of the list of identities of the plurality of UEs (300) that are already registered at the AMF apparatus (100*a*) and the list of corresponding S-NSSAI that require the admission control with the NSACF apparatus (200), and the list of PDU-Session IDs that are already activated with the SMF apparatus (400) and the list of corresponding S-NSSAI that require the admission control with the NSACF apparatus (200).

The plurality of UEs (300) are registered to the network slice requiring admission control with respect to a number of UEs allowed to be registered and a number of PDU sessions activated on the network slice requiring admission control. The number of UEs per slice update request message comprises a list of identities of the plurality of UEs (300) that are already registered at the AMF apparatus (100*a*) and a list of corresponding S-NSSAI that require the admission control with the NSACF apparatus (200). The number of PDUs per slice update request message comprises a list of PDU-Session IDs that are already activated with the SMF apparatus (400) and a list of corresponding S-NSSAI that require the admission control with the NSACF apparatus (200).

Further, the first AMF apparatus (100*a*) is configured to determine planned removal of the AMF apparatus and send the number of UEs per slice update request message to the NSACF apparatus (200) to decrease the count of the quota, where the number of UEs per slice update request message includes the list of identities of the plurality of UEs (300). Further, the first AMF apparatus (100*a*) is configured to receive the number of UEs per slice update response message from the NSACF apparatus (200) confirming decrease in the count and the quota is available for other UEs, wherein the number of UEs per slice update response message comprises the list of identities of the plurality of UEs (300).

Further, the second AMF apparatus (100*b*) is configured to register the plurality of UEs (300) that are previously registered at the first AMF apparatus (100*a*) when the first AMF apparatus (100*a*) is planned for the removal. Further, the second AMF apparatus (100*b*) is configured to send the number of UEs per slice update request message to update the NSACF apparatus (200) to increase the count, where the number of UEs per slice update request message includes the list of identities of the plurality of UEs previously registered at the first AMF apparatus (100*a*). Further, the second AMF apparatus (100*b*) is configured to receive the number of UEs per slice update response message from the NSACF apparatus (200) confirming increase in the count, where the number of UEs per slice update response message comprises the list of identities of the plurality of UEs (300).

In an embodiment, the first AMF apparatus (100*a*) is configured to register the first UE (300*a*) of the plurality of UEs (300) based on availability of the quota at the NSACF apparatus (200) in the wireless network (1000). Further, the first AMF apparatus (100*a*) is configured to send the request message to increase the count of the quota for the registration of the first UE at the first AMF apparatus (100*a*) to the NSACF apparatus (200). Further, the first AMF apparatus (100*a*) is configured to receive the AMF status change subscribe for unavailability notification from the NSACF apparatus (200). Further, the first AMF apparatus (100*a*) is configured to register the second UE (300*b*) of the plurality of UEs (300) for the service. Further, the first AMF apparatus (100*a*) is configured to send the request message to increase the count of the quota for registration of the second UE (300*b*) at the first AMF apparatus (100*a*) to the NSACF apparatus (200). Further, the first AMF apparatus (100*a*) is configured to detect planned AMF removal of the first AMF apparatus (100*a*). Further, the first AMF apparatus (100*a*) is configured to send the AMF status change notification to the NSACF apparatus (200), where the AMF status change notification indicates that the planned AMF removal and the UEs registered at the first AMF apparatus (100*a*) is handled by a second AMF apparatus (100*b*).

In an embodiment, the NSACF apparatus (200) is configured to enable the configuration to perform the admission control of the UEs (300) and the admission control of PDUs in the wireless network (1000) based on availability of the quota at NSACF apparatus (200). Further, the NSACF apparatus (200) is configured to receive the number of UEs per slice update request message from the AMF apparatus (100*a*) or the SMF apparatus (400). Further, the NSACF apparatus (200) is configured to increase the count of the quota for the already registered UEs (300) and the already activated or established PDUs based on the number of UEs per slice update request message. Further, the NSACF apparatus (200) is configured to enforce the quota to perform the admission control of the UEs (300) and the admission control of PDUs in the wireless network (1000).

Further, the NSACF apparatus (200) is configured to disable the configuration to perform the admission control of the UEs (300) and the admission control of PDUs based on availability of the quota at the NSACF apparatus (200) in the wireless network (1000) and receive the number of UEs per slice update request message from the AMF apparatus (100*a*) or the SMF apparatus (400). Further, the NSACF apparatus (200) is configured to decrease the count of the quota for the already registered UEs (300) and the already activated or established PDUs based on the number of UEs per slice update request message.

Further, the NSACF apparatus (200) is configured to is configured to receive the number of UEs per slice update request message from the first AMF apparatus (100*a*) to decrease the count during a planned AMF removal at the first AMF apparatus (100*a*), where the number of UEs per slice update request message includes the list of identities of the plurality of UEs (300). Further, the NSACF apparatus (200) is configured to decrease the count by removing entries of the plurality of UEs (300) based on the list of identities provided in the number of UEs per slice update request message. Further, the NSACF apparatus (200) is configured to send the number of UEs per slice update response message to the first AMF apparatus (100*a*) confirming decrease in the count, where the number of UEs per slice update response message includes the list of identities of the plurality of UEs (300).

Further, the NSACF apparatus (200) is configured to receive the number of UEs per slice update request message from the second AMF apparatus (100*b*) to increase the count, where the number of UEs per slice update request message comprises the list of identities of the plurality of UEs previously registered at the first AMF apparatus (100*a*). Further, the NSACF apparatus (200) is configured to send the number of UEs per slice update response message to the second AMF apparatus (100*b*) confirming increase in the count, where the number of UEs per slice update response message comprises the list of identities of the plurality of UEs (300).

In another embodiment, the NSACF apparatus (200) is configured to receive a request message to increate a count of the quota for the registration of the first UE (300*a*) from the plurality of UEs (300) at the first AMF apparatus (100*a*) for the service. Further, the NSACF apparatus (200) is configured to send the AMF status change subscribe for unavailability notification to the first AMF apparatus (100*a*) or a NRF apparatus. Further, the NSACF apparatus (200) is configured to receive a request message to increase a count of the quote for the registration of the second UE (300*b*) from the plurality of UEs (300) at the first AMF apparatus (100*a*) for the service. Further, the NSACF apparatus (200) is configured to increase the count of the quota for the registration of the second UE (300*b*) at the first AMF apparatus (100*a*). Further, the NSACF apparatus (200) is configured to receive the AMF status change notification from the first AMF apparatus (100*a*) or the NRF apparatus, where the AMF status change notification indicates the planned AMF removal and the UEs registered at the first AMF apparatus (100*a*) is handled by a second AMF apparatus (100*b*). Further, the NSACF apparatus (200) is configured to remove entries corresponding to the first UE and the second UE (300*b*) registered at the first AMF apparatus (100*a*). Further, the NSACF apparatus (200) is configured to associate the entries corresponding to the first UE and the second UE (300*b*) previously registered at the first AMF apparatus (100*a*) to the second AMF apparatus (100*b*) without increasing the count.

Further, the NSACF apparatus (200) is configured to receive a number of UEs per slice availability check and update request message from the second AMF apparatus (100*b*) to increase the count of at least one UE of the plurality of UEs previously registered at the first AMF apparatus (100*a*). Further, the NSACF apparatus (200) is configured to detect the count the UEs registered at the first AMF apparatus (100*a*) and is already associated with the second AMF apparatus (100*b*) and send the number of UEs per slice availability check and update response message to the second AMF apparatus (100*b*) without increasing in the count, wherein the number of UEs per slice update response message comprises a list of identities of the at least one UE.

Further, the NSACF apparatus (200) is configured to receive a number of UEs per slice availability check and update request message from the second AMF apparatus (100*b*) to decrease the count of the at least one UE and detect that the UE associated with the second AMF apparatus (100*b*) is the only entry in response message to receiving the number of UEs per slice availability check and update request message from the second AMF apparatus (100*b*). Further, the NSACF apparatus (200) is configured to decrease the count in response to detecting that the UE associated with the second AMF apparatus (100*b*) is the only entry and send a number of UEs per slice availability check and update response message to the second AMF apparatus (100*b*) confirming decrease in the count, where the number of UEs per slice update response message comprises a list of identities of the at least one UE.

FIG. 9*b* shows various hardware components of the first AMF apparatus (100*a*), according to an embodiment as disclosed herein. In an embodiment, the first AMF apparatus (100*a*) includes a processor (110*a*), a communicator (120*a*), a memory (130*a*), and a planned removal controller (140*a*). The processor (110*a*) is coupled with the communicator (120*a*), the memory (130*a*) and the planned removal controller (140*a*).

In an embodiment, the planned removal controller (140*a*) registers the plurality of UEs (300) to the network slice requiring admission control and detects enablement of the configuration to perform the admission control on the already deployed existing slice based on availability of the quota at the NSACF apparatus (200) in the wireless network (1000). Further, the planned removal controller (140*a*) sends the number of UEs per slice update request message to the NSACF apparatus (200) to increase the count of the quota for the already registered UEs (300).

Further, the planned removal controller (140*a*) detects disablement of the configuration to perform the admission control based on availability of the quota at the NSACF apparatus (200) in the wireless network (1000) and sends the number of UEs per slice update request message to the NSACF apparatus (200) to decrease the count of the quota for the already registered UEs (300).

Further, the planned removal controller (140*a*) determines planned removal of the AMF apparatus and send the number of UEs per slice update request message to the NSACF apparatus (200) to decrease the count of the quota. The number of UEs per slice update request message includes the list of identities of the plurality of UEs (300), the planned removal controller (140*a*) receives the number of UEs per slice update response message from the NSACF apparatus (200) confirming decrease in the count and the quota is available for other UEs. The number of UEs per slice update response message includes the list of identities of the plurality of UEs (300).

In another embodiment, the planned removal controller (140*a*) registers the plurality of UEs (300) to the network slice requiring admission control based on availability of the quota at the NSACF apparatus (200). Further, the planned removal controller (140*a*) sends the number of UEs per slice update request message to increase the count of the plurality of UEs registered at the first AMF apparatus (100*a*) to the NSACF apparatus (200). Further, the planned removal controller (140*a*) detects the planned removal of the first AMF apparatus (100*a*) and send the number of UEs per slice update request message to the NSACF apparatus (200) to decrease the count of the quota. The number of UEs per slice update request message includes a list of identities of the plurality of UEs (300). Further, the planned removal controller (140*a*) receives the number of UEs per slice update response message from the NSACF apparatus (200) confirming decrease in the count and the quota is now available for other UEs in the wireless network (1000). The number of UEs per slice update response message includes the list of identities of the plurality of UEs (300).

In another embodiment, the planned removal controller (140*a*) registers the first UE of the plurality of UEs (300) based on the availability of the quota at the NSACF apparatus (200) in the wireless network (1000). Further, the planned removal controller (140*a*) sends the request message to increase the count of the quota for the registration of the first UE at the first AMF apparatus (100*a*) to the NSACF apparatus (200). Further, the planned removal controller (140*a*) receive the AMF status change subscribe for unavailability notification from the NSACF apparatus (200). Further, the planned removal controller (140*a*) registers at least one second UE of the plurality of UEs (300) for the service. Further, the planned removal controller (140*a*) sends the request message to increase the count of the quota for registration of the at least one second UE at the first AMF apparatus (100*a*) to the NSACF apparatus (200). Further, the planned removal controller (140*a*) detects planned AMF removal of the first AMF apparatus (100*a*). Further, the planned removal controller (140a) sends the AMF status change notification to the NSACF apparatus (200). The AMF status change notification indicates that the planned AMF removal and the UEs registered at the first AMF apparatus (100*a*) is handled by the second AMF apparatus (100*b*).

The planned removal controller (140*a*) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110*a*) is configured to execute instructions stored in the memory (130*a*) and to perform various processes. The communicator (120*a*) is configured for communicating internally between internal hardware components and with external devices via one or more networks. The memory (130*a*) also stores instructions to be executed by the processor (110*a*). The memory (130*a*) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130*a*) may, in some examples, be considered a non-transitory storage medium. The term "non-transitory" may indicate that the storage medium is not embodied in a carrier wave or a propagated signal. However, the term "non-transitory" should not be interpreted that the memory (130*a*) is non-movable. In certain examples, a non-transitory storage medium may store data that can, over time, change (e.g., in Random Access Memory (RAM) or cache).

Although the FIG. 9*b* shows various hardware components of the first AMF apparatus (100*a*) but it is to be understood that other embodiments are not limited thereon. In other embodiments, the first AMF apparatus (100*a*) may include less or more number of components. Further, the labels or names of the components are used only for illustrative purpose and does not limit the scope of the invention. One or more components can be combined together to perform same or substantially similar function in the first AMF apparatus (100*a*).

FIG. 9*c* shows various hardware components of the second AMF apparatus (100*b*), according to an embodiment as disclosed herein. In an embodiment, the second AMF apparatus (100*b*) includes a processor (110*b*), a communicator (120*b*), a memory (130*b*), and a planned removal controller (140*b*). The processor (110*b*) is coupled with the communicator (120*b*), the memory (130*b*) and the planned removal controller (140*b*).

In an embodiment, the planned removal controller (140*b*) registers the plurality of UEs (300) that are previously registered at the first AMF apparatus (100*a*) when the first AMF apparatus (100*a*) is planned for the removal. Further, the planned removal controller (140*b*) sends the number of UEs per slice update request message to update the NSACF apparatus (200) to increase the count. The number of UEs per slice update request message includes the list of identities of the plurality of UEs previously registered at the first AMF apparatus (100*a*). Further, the planned removal controller (140*b*) receives the number of UEs per slice update response message from the NSACF apparatus (200) confirming increase in the count, where the number of UEs per slice update response message includes the list of identities of the plurality of UEs (300).

The planned removal controller (140*b*) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110*b*) is configured to execute instructions stored in the memory (130*b*) and to perform various processes. The communicator (120*b*) is configured for communicating internally between internal hardware components and with external devices via one or more networks. The memory (130*b*) also stores instructions to be executed by the processor (110*b*). The memory (130*b*) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130*b*) may, in some examples, be considered a non-transitory storage medium. The term "non-transitory" may indicate that the storage medium is not embodied in a carrier wave or a propagated signal. However, the term "non-transitory" should not be interpreted that the memory (130*b*) is non-movable. In certain examples, a non-transitory storage medium may store data that can, over time, change (e.g., in Random Access Memory (RAM) or cache).

Although the FIG. 9*c* shows various hardware components of the second AMF apparatus (100*b*) but it is to be understood that other embodiments are not limited thereon. In other embodiments, the second AMF apparatus (100*b*) may include less or more number of components. Further, the labels or names of the components are used only for illustrative purpose and does not limit the scope of the invention. One or more components can be combined together to perform same or substantially similar function in the second AMF apparatus (100*b*).

FIG. 9*d* shows various hardware components of the NSACF apparatus (200), according to an embodiment as disclosed herein. In an embodiment, the NSACF apparatus (200) includes a processor (210), a communicator (220), a memory (230), and a planned removal controller (240). The processor (210) is coupled with the communicator (220), the memory (230) and the planned removal controller (240).

In an embodiment, the planned removal controller (240) enables a configuration to perform the admission control of the UEs (300) in the wireless network (1000) based on availability of the quota at NSACF apparatus (200). Further, the planned removal controller (240) receives the number of UEs per slice update request message from the AMF apparatus (100*a*) or the SMF apparatus (400). Further, the planned removal controller (240) enforces the quota to perform the admission control of the UEs (300) in the wireless network (1000).

In another embodiment, the planned removal controller (240) disables the configuration to perform the admission control of the UEs (300) based on availability of the quota at the NSACF apparatus (200) in the wireless network (1000) and receives the number of UEs per slice update request message from the AMF apparatus (100*a*) or the SMF apparatus (400). Further, the planned removal controller (240) decreases the count of the quota for the already registered UEs (300) based on the number of UEs per slice update request message.

In another embodiment, the planned removal controller (240) receives the number of UEs per slice update request message from the first AMF apparatus (100*a*) to decrease the count during the planned AMF removal at the first AMF apparatus (100*a*). The number of UEs per slice update request message includes the list of identities of the plurality of UEs (300). Further, the planned removal controller (240) decreases the count by removing entries of the plurality of UEs (300) based on the list of identities provided in the number of UEs per slice update request message. Further, the planned removal controller (240) sends the number of UEs per slice update response message to the first AMF apparatus (100*a*) confirming decrease in the count. The number of UEs per slice update response message includes the list of identities of the plurality of UEs (300).

In another embodiment, the planned removal controller (240) receives the number of UEs per slice update request message from the second AMF apparatus (100*b*) to increase the count, where the number of UEs per slice update request message includes the list of identities of the plurality of UEs previously registered at the first AMF apparatus (100*a*). Further, the planned removal controller (240) sends the number of UEs per slice update response message to the second AMF apparatus (100*b*) confirming increase in the count, where the number of UEs per slice update response message comprises the list of identities of the plurality of UEs (300).

In another embodiment, the planned removal controller (240) enables a configuration to perform the admission control of the UEs (300) in the wireless network (1000) based on availability of the quota at the NSACF apparatus (200). Further, the planned removal controller (240) receives the number of UEs per slice update request message from the first AMF apparatus (100*a*) to decrease the count of the quota during the planned AMF removal at the first AMF apparatus (100*a*). The number of UEs per slice update request message includes the list of identities of the plurality of UEs. Further, the planned removal controller (240) decreases the count by removing entries of the plurality of UEs (300) at the NSACF apparatus (200) based on the list of identities of the UEs provided in the number of UEs per slice update request message. Further, the planned removal controller (240) sends the number of UEs per slice update response message to the first AMF apparatus (100*a*) confirming decrease in the count and the quota is now available for other UEs, where the number of UEs per slice update response message includes the list of identities of the plurality of UEs (300).

Further, the planned removal controller (240) receives the number of UEs per slice update request message from the second AMF apparatus (100*b*) to increase the count, where the number of UEs per slice update request message includes the list of identities of the plurality of UEs previously registered at the first AMF apparatus (100*a*). Further, the planned removal controller (240) increases the count of the quota based on the number of UEs per slice update request message received from the second AMF apparatus (100*b*). Further, the planned removal controller (240) sends the number of UEs per slice update response message to the second AMF apparatus (100*b*) confirming increase in the count, where the number of UEs per slice update response message comprises the list of identities of the plurality of UEs (300).

In another embodiment, the planned removal controller (240) receives the request message to increase the count of the quota for the registration of the first UE (300*a*) from the plurality of UEs (300) at the first AMF apparatus (100*a*) for the service. Further, the planned removal controller (240) sends the AMF status change subscribe for unavailability notification to the first AMF apparatus (100*a*) or the NRF apparatus. Further, the planned removal controller (240) receives the request message to increase the count of the quote for the registration of the second UE (100*b*) from the plurality of UEs (300) at the first AMF apparatus (100*a*) for the service. Further, the planned removal controller (240) increases the count of the quota for the registration of the at least one second UE at the first AMF apparatus (100*a*). Further, the planned removal controller (240) receives the AMF status change notification from the first AMF apparatus (100*a*) or the NRF apparatus, where the AMF status change notification indicates the planned AMF removal and the UEs registered at the first AMF apparatus (100*a*) is handled by a second AMF apparatus (100*b*). Further, the planned removal controller (240) removes entries corresponding to the first UE (300*a*) and the second UE (300*b*) registered at the first AMF apparatus (100*a*). Further, the planned removal controller (240) associates the entries corresponding to the first UE (300*a*) and the second UE (300*b*) previously registered at the first AMF apparatus (100*a*) to the second AMF apparatus (100*b*) without increasing the count.

Further, the planned removal controller (240) receives the number of UEs per slice availability check and update request message from the second AMF apparatus (100*b*) to increase the count of at least one UE of the plurality of UEs previously registered at the first AMF apparatus (100*a*). Further, the planned removal controller (240) detects the count the UEs registered at the first AMF apparatus (100*a*) and is already associated with the second AMF apparatus (100*b*). Further, the planned removal controller (240) sends the number of UEs per slice availability check and update response message to the second AMF apparatus (100*b*) without increasing in the count, where the number of UEs per slice update response message includes the list of identities of the UE (300*a*).

Further, the planned removal controller (240) receives the number of UEs per slice availability check and update request message from the second AMF apparatus (100*b*) to decrease the count of the UE (300). Further, the planned removal controller (240) detects that the UE (300*a*) associated with the second AMF apparatus (100*b*) is the only entry in response message to receiving the number of UEs per slice availability check and update request message from the second AMF apparatus (100*b*). Further, the planned removal controller (240) decreases the count in response to detecting that the UE (300*a*) associated with the second AMF apparatus (100*b*) is the only entry. Further, the planned removal controller (240) sends the number of UEs per slice availability check and update response message to the second AMF apparatus (100*b*) confirming decrease in the count, wherein the number of UEs per slice update response message includes the list of identities of the UE (300*a*).

The planned removal controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 9*d* shows various hardware components of the NSACF apparatus (200) but it is to be understood that other embodiments are not limited thereon. In other embodiments, the NSACF apparatus (200) may include less or more number of components. Further, the labels or names of the components are used only for illustrative purpose and does not limit the scope of the invention. One or more components can be combined together to perform same or substantially similar function in the NSACF apparatus (200).

FIG. 9*e* shows various hardware components of the SMF apparatus (400), according to an embodiment as disclosed herein. In an embodiment, the SMF apparatus (400) includes a processor (410), a communicator (420), a memory (430), and a planned removal controller (440). The processor (410) is coupled with the communicator (420), the memory (430) and the planned removal controller (440).

In an embodiment, the planned removal controller (440) registers the plurality of UEs (300) to the network slice requiring admission control. Based on availability of the quota at the NSACF apparatus (200) in the wireless network (1000), the planned removal controller (440) detects enablement of the configuration to perform the admission control on an already deployed existing slice. The planned removal controller (440) sends the number of PDUs per slice update request message to the NSACF apparatus (200) to increase the count of the quota for the already activated or established PDUs for each UEs.

In another embodiment, the planned removal controller (440) detects disablement of the configuration to perform the admission control based on availability of the quota at the NSACF apparatus (200) in the wireless network (1000) and sends the number of UEs per slice update request message to the NSACF apparatus (200) to decrease the count of the quota for the already registered UEs (300).

The planned removal controller (440) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in Random Access Memory (RAM) or cache).

Although the FIG. 9*e* shows various hardware components of the SMF apparatus (400) but it is to be understood that other embodiments are not limited thereon. In other embodiments, the SMF apparatus (400) may include less or more number of components. Further, the labels or names of the components are used only for illustrative purpose and does not limit the scope of the invention. One or more components can be combined together to perform same or substantially similar function in the SMF apparatus (400).

FIG. 10 is a flow chart (S1000) illustrating a method, implemented by the AMF apparatus (100*a*) or the SMF apparatus (400), for NSAC based on availability of the quota at the NSACF apparatus (200) in the wireless network (1000), according to the embodiments enclosed herein;

At S1002, the AMF apparatus (100*a*) or the SMF apparatus (400) registers the plurality of UE (300) to the network slice requiring admission control. At S1004, the AMF apparatus (100*a*) or the SMF apparatus (400) detects enablement of the configuration to perform the admission control on an already deployed existing slice based on availability of the quota at the NSACF apparatus (200) in the wireless network (1000). At S1006, the AMF apparatus (100*a*) sends the number of UEs per slice update request message to the NSACF apparatus (200) to increase the count of the quota for the already registered UEs (300). At S1008, the first SMF apparatus (400) sends the number of PDUs per slice update request message to the NSACF apparatus (200) to increase the count of the quota for the already activated or established PDUs for each UEs.

FIG. 11 is a flow chart (S1100) illustrating a method, implemented by the first AMF apparatus (100*a*), for NSAC based on availability of the quota at the NSACF apparatus (200) in the wireless network (1000), according to the embodiments enclosed herein. The operations (S1102-S1110) are performed by the planned removal controller (140*a*).

At S1102, the method includes registering the plurality of UEs (300) to the network slice requiring admission control based on the availability of the quota at the NSACF apparatus (200). At S1104, the method includes sending the number of UEs per slice update request message to increase the count of the plurality of UEs registered at the first AMF apparatus (100*a*) to the NSACF apparatus (200). At S1106, the method includes detecting the planned removal of the first AMF apparatus (100*a*). At S1108, the method includes sending the number of UEs per slice update request message to the NSACF apparatus (200) to decrease the count of the quota. The number of UEs per slice update request message includes the list of identities of the plurality of UEs (300). At S1110, the method includes receiving the number of UEs per slice update response message from the NSACF apparatus (200) confirming decrease in the count and the quota is now available for other UEs in the wireless network (1000). The number of UEs per slice update response message includes the list of identities of the plurality of UEs (300).

FIG. 12 is a flow chart (S1200) illustrating a method, implemented by the first AMF apparatus (100*a*), for NSAC based on availability of the quota at the NSACF apparatus (200) in the wireless network (1000) using an AMF status change notification, according to the embodiments enclosed herein. The operations (S1202-S1214) are performed by the planned removal controller (140*a*).

At S1202, the method includes registering the first UE of the plurality of UEs (300) based on availability of the quota at the NSACF apparatus (200) in the wireless network (1000). At S1204, the method includes sending the request message to increase the count of the quota for the registration of the first UE at the first AMF apparatus (100*a*) to the NSACF apparatus (200). At S1206, the method includes receiving the AMF status change subscribe for unavailability notification from the NSACF apparatus (200). At S1208, the method includes registering the second UE of the plurality of UEs (300) for the service. At S1210, the method includes sending the request message to increase the count of the quota for registration of the second UE at the first AMF apparatus (100*a*) to the NSACF apparatus (200). At S1212, the method includes detecting the planned AMF removal of the first AMF apparatus (100*a*). At S1214, the method includes sending the AMF status change notification to the NSACF apparatus (200), where the AMF status change notification indicates that the planned AMF removal and the UEs registered at the first AMF apparatus (100*a*) is handled by the second AMF apparatus (100*b*).

FIG. 13 is a flow chart (S1300) illustrating a method, implemented by the NSACF apparatus (200), for NSAC based on availability of the quota at the NSACF apparatus (200) in the wireless network (1000) using a number of UEs per slice update request message, according to the embodiments enclosed herein. The operations (S1302-S1308) are performed by the planned removal controller (240).

At S1302, the method includes enabling the configuration to perform the admission control of the UEs (300) in the wireless network (1000) based on availability of the quota at the NSACF apparatus (200). At S1304, the method includes receiving the number of UEs per slice update request message from the AMF apparatus (100*a*) or the SMF apparatus (400). At S1306, the method includes increasing the count of the quota for the already registered UEs (300) based on the number of UEs per slice update request message. At S1308, the method includes enforcing the quota to perform the admission control of the UEs (300) in the wireless network (1000).

FIG. 14 is a flow chart (S1400) illustrating a method, implemented by the NSACF apparatus (200), for NSAC based on availability of the quota at the NSACF apparatus (200) in the wireless network (1000) using the number of UEs per slice update request message including the list of identities of the plurality of UEs, according to the embodiments enclosed herein. The operations (S1402-S1408) are performed by the planned removal controller (240).

At S1402, the method includes enabling the configuration to perform the admission control of the UEs (300) in the wireless network (1000) based on availability of the quota at the NSACF apparatus (200). At S1404, the method includes receiving the number of UEs per slice update request message from the first AMF apparatus (100*a*) to decrease the count of the quota during the planned AMF removal at the first AMF apparatus (100*a*). The number of UEs per slice update request message includes the list of identities of the plurality of UEs (300). At S1406, the method includes decreasing the count by removing entries of the plurality of UEs (300) at the NSACF apparatus (200) based on the list of identities of the UEs provided in the number of UEs per slice update request message. At S1408, the method includes sending the number of UEs per slice update response message to the first AMF apparatus (100*a*) confirming decrease in the count and the quota is now available for other UEs. The number of UEs per slice update response message includes the list of identities of the plurality of UEs (300).

FIG. 15 is a flow chart (S1500) illustrating a method, implemented by the NSACF apparatus (200), for NSAC based on availability of the quota at the NSACF apparatus (200) in the wireless network (1000) using the AMF status change notification, according to the embodiments enclosed herein. The operations (S1502-S1514) are performed by the planned removal controller (240).

At S1502, the method includes receiving the request message to increate a count of the quota for the registration of the first UE from the plurality of UEs (300) at the first AMF apparatus (100*a*) for the service. At S1504, the method includes sending the AMF status change subscribe for unavailability notification to the first AMF apparatus (100*a*) or the Network Repository Function (NRF) apparatus. At S1506, the method includes receiving the request message to increase the count of the quote for the registration of the at least one second UE from the plurality of UEs (300) at the first AMF apparatus (100*a*) for the service. At S1508, the method includes increasing the count of the quota for the registration of the at least one second UE at the first AMF apparatus (100*a*).

At S1510, the method includes receiving the AMF status change notification from the first AMF apparatus (100*a*) or the NRF apparatus, where the AMF status change notification indicates the planned AMF removal and the UEs registered at the first AMF apparatus (100*a*) is handled by the second AMF apparatus (100*b*). At S1512, the method includes removing entries corresponding to the first UE and the second UE registered at the first AMF apparatus (100*a*). At S1514, the method includes associating the entries corresponding to the first UE and the at least one second UE previously registered at the first AMF apparatus (100*a*) to the second AMF apparatus (100*b*) without increasing the count.

The various actions, acts, blocks, steps, or the like in the flow charts (S1000-S1500) may be performed in the order presented, in a different order or simultaneously. Further, in some embodiments, some of the actions, acts, blocks, steps, or the like may be omitted, added, modified, skipped, or the like without departing from the scope of the invention. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a first access and mobility management function (AMF) in a wireless network, the method comprising:

identifying at least one user equipment (UE) with a registration to at least one network slice related to admission control;

transmitting, to a network slice admission control function (NSACF), a first request message to update a total number of UEs registered per network slice availability, based on the at least one UE; and receiving, from the NSACF, a response message for the first request message, wherein the first request message includes a list of at least one identity of the at least one UE and a list of at least one corresponding single-network slice selection assistance information (S-NSSAI) related to the admission control with the NSACF.

2. The method of claim 1, further comprising:

receiving, from the NSACF, an AMF status change subscription for unavailability notification;

detecting planned AMF removal of the first AMF; and transmitting, to the NSACF, an AMF status change notification.

3. The method of claim 2, wherein the AMF status change notification indicates the planned AMF removal of the first AMF.

4. The method of claim 3, wherein in case of a second request message, from a second AMF, to increase the total number of UEs registered per network slice availability for a first UE among the at least one UE, the total number of UEs registered per network slice availability is not increased, and a first identifier of the first AMF for the first UE is replaced with a second identifier of the second AMF.

5. The method of claim 3, wherein the AMF status change notification includes a first identifier of the first AMF, and wherein the first identifier is a globally unique AMF identifier (GUAMI).

6. A method performed by a network slice admission control function (NSACF) in a wireless network, the method comprising:

receiving, from a first access and mobility management function (AMF), a first request message to update a total number of user equipments (UEs) registered per network slice availability, based on at least one UE with a registration to at least one network slice related to admission control;

transmitting, to the first AMF, a response message for the first request message;

receiving, from a second AMF, a second request message to increase the total number of UEs registered per network slice availability for a first UE among the at least one UE registered by the first AMF;

in response to the second request message, not increasing the total number of UEs registered per network slice availability; and replacing a first identifier of the first AMF for the first UE with a second identifier of the second AMF wherein the first request message includes a list of at least one identity of the at least one UE and a list of at least one corresponding single-network slice selection assistance information (S-NSSAI) related to the admission control with the NSACF.

7. The method of claim 6, further comprising:

transmitting, to the first AMF, an AMF status change subscription for unavailability notification; and in case that planned AMF removal of the first AMF is detected, receiving, from the first AMF, an AMF status change notification.

8. The method of claim 7, wherein the AMF status change notification indicates the planned AMF removal of the first AMF.

9. The method of claim 8, wherein the AMF status change notification includes a first identifier of the first AMF, and wherein the first identifier is a globally unique AMF identifier (GUAMI).

10. A first access and mobility management function (AMF) entity in a wireless network, the first AMF entity comprising:

a transceiver; and at least one processor coupled to the transceiver and configured to:

identify at least one user equipment (UE) with a registration to at least one network slice related to admission control, transmit, to a network slice admission control function (NSACF) entity, a first request message to update a total number of UEs registered per network slice availability, based on the at least one UE, and receive, from the NSACF entity, a response message for the first request message, wherein the first request message includes a list of at least one identity of the at least one UE and a list of at least one corresponding single-network slice selection assistance information (S-NSSAI) related to the admission control with the NSACF entity.

11. The first AMF entity of claim 10, wherein the at least one processor is further configured to:

receive, from the NSACF entity, an AMF status change subscription for unavailability notification, detect planned AMF removal of the first AMF entity, and transmit, to the NSACF entity, an AMF status change notification.

12. The first AMF entity of claim 11, wherein the AMF status change notification indicates the planned AMF removal of the first AMF entity.

13. The first AMF entity of claim 12, wherein in case of a second request message, from a second AMF entity, to increase the total number of UEs registered per network slice availability for a first UE among the at least one UE, the total number of UEs registered per network slice availability is not increased, and a first identifier of the first AMF entity for the first UE is replaced with a second identifier of the second AMF entity.

14. The first AMF entity of claim 12, wherein the AMF status change notification includes a first identifier of the first AMF, and wherein the first identifier is a globally unique AMF identifier (GUAMI).

15. A network slice admission control function (NSACF) entity in a wireless network, the NSACF entity comprising:

a transceiver; and at least one processor coupled to the transceiver and configured to:

receive, from a first access and mobility management function (AMF) entity, a first request message to update a total number of user equipments (UEs) registered per network slice availability, based on for at least one UE with a registration to at least one network slice related to admission control, and transmit, to the first AMF entity, a response message for the first request message, wherein the first request message includes a list of at least one identity of the at least one UE and a list of at least one corresponding single-network slice selection assistance information (S-NSSAI) related to the admission control with the NSACF entity.

16. The NSACF entity of claim 15, wherein the at least one processor is further configured to:

transmit, to the first AMF entity, an AMF status change subscription for unavailability notification, and in case that planned AMF removal of the first AMF entity is detected, receive, from the first AMF entity, an AMF status change notification.

17. The NSACF entity of claim 16, wherein the AMF status change notification indicates the planned AMF removal of the first AMF entity.

18. The NSACF entity of claim 17, wherein the at least one processor is further configured to:

receive, from a second AMF entity, a second request message to increase the total number of UEs registered per network slice availability for a first UE among the at least one UE, in response to the second request message, not increase the total number of UEs registered per network slice availability and replace a first identifier of the first AMF entity for the first UE with a second identifier of the second AMF entity.

19. The NSACF entity of claim 17, wherein the AMF status change notification includes a first identifier of the first AMF, and wherein the first identifier is a globally unique AMF identifier (GUAMI).

* * * * *